United States Patent [19]

Hill

[11] 4,138,847
[45] Feb. 13, 1979

[54] HEAT RECUPERATIVE ENGINE

[76] Inventor: Craig C. Hill, Winter St., Lincoln, Mass. 01773

[21] Appl. No.: 814,388

[22] Filed: Jul. 11, 1977

[51] Int. Cl.² ............................................. F02G 1/04
[52] U.S. Cl. .................................... 60/508; 60/519; 60/525; 60/516
[58] Field of Search ................. 60/530, 508, 512, 509, 60/516, 517, 525, 650, 682

[56]  References Cited

U.S. PATENT DOCUMENTS

| 3,763,649 | 10/1973 | Wahnschaffe | 60/519 |
| 3,823,559 | 7/1974 | Foret | 60/508 |
| 4,009,573 | 3/1977 | Satz | 60/519 |

Primary Examiner—Allen M. Ostrager
Attorney, Agent, or Firm—Wolf, Greenfield & Sacks

[57] ABSTRACT

A heat engine employs counterrotating rotors disposed in different cavities of a stator. The engine provides a heat recuperator which removes heat from working medium confined in a rotating constant volume chamber in one cavity and utilizes that heat to heat working medium confined in a rotating constant volume chamber in another cavity. Each rotor carries partitions forming separate chambers in its cavity and each cavity has a blocking means which permits the partitions to pass but prevents working medium from making a complete orbit in the cavity whereby the working medium is caused to flow from one cavity to another through ducts disposed near the blocking means.

17 Claims, 17 Drawing Figures

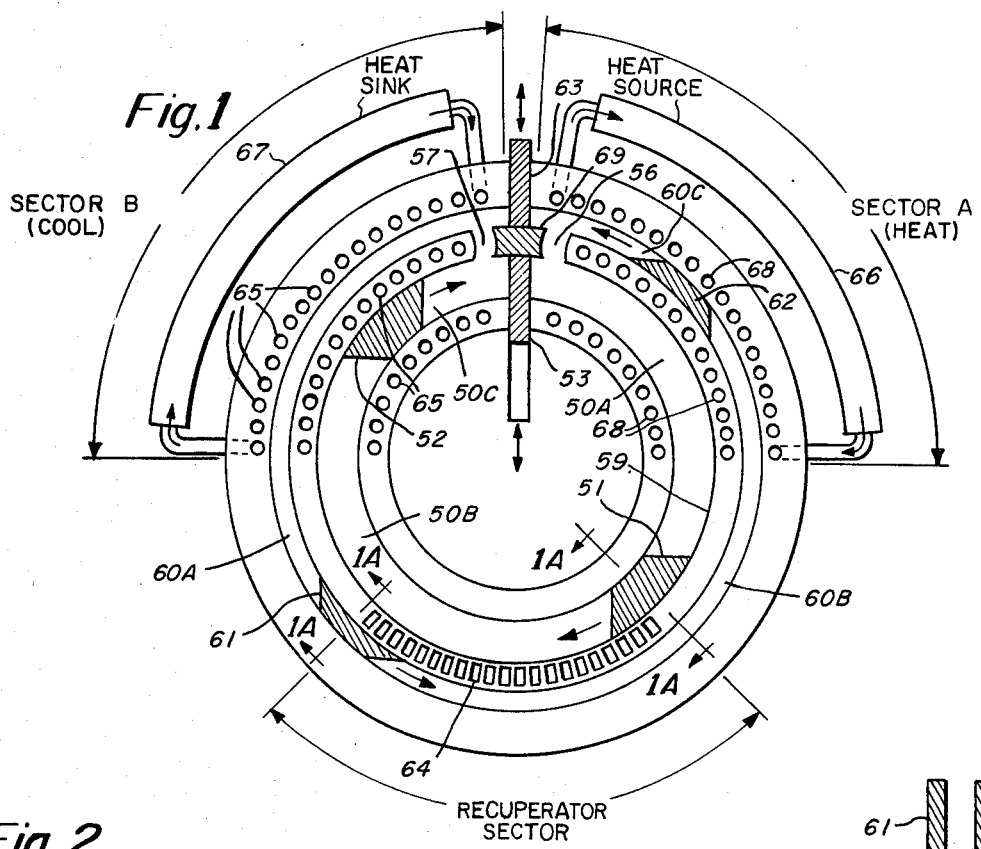
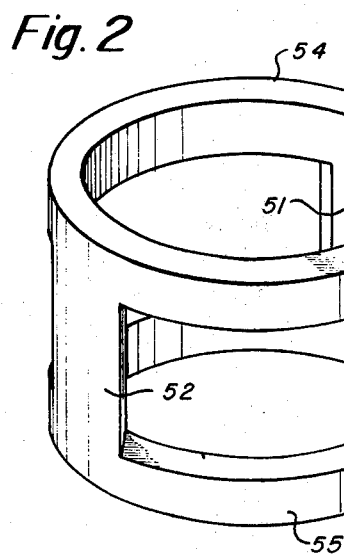
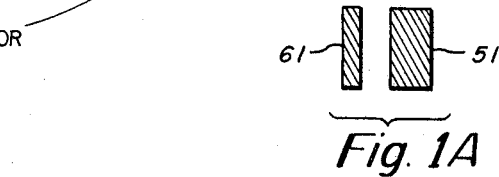
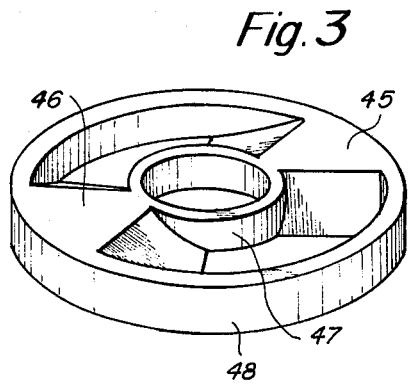

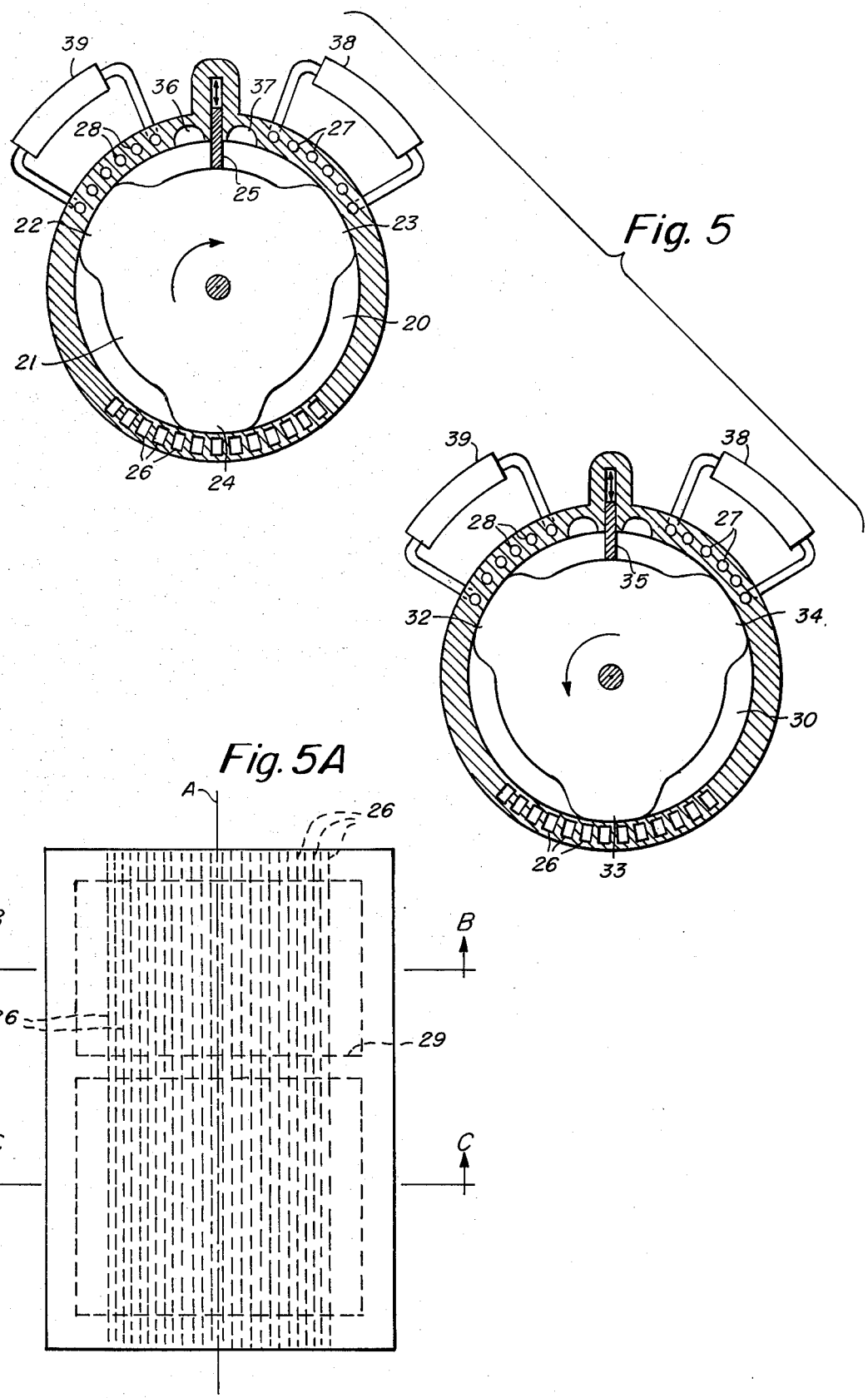

HEAT RECUPERATIVE ENGINE

FIELD OF THE INVENTION

This invention relates in general to heat engines. More particularly, the invention pertains to a heat engine whose cycle of operation has a compression phase, a constant volume heat variation phase of substantial duration, an expansion phase, and a second constant volume heat variation phase of substantial duration.

SUMMARY OF THE INVENTION

In effecting a constant volume heat-variation phase according to the invention, a constant volume chamber is provided by a relatively stationary engine casing and at least two moving members which displace equal or nearly equal volumes in equal times so as to form between them a moving chamber which remains constant in volume for the duration of that phase. The working medium confined within that chamber is thus positively displaced and constrained to follow the path of the moving chamber within the engine while the volume of the confined working medium remains constant during that phase.

The invention can be embodied in a prime mover and in an engine for pumping heat. When embodied in a heat pump, external power must be employed to turn the engine while a gaseous working medium is caused to absorb heat from a lower temperature heat source during an expansion phase, and during a compression phase the working medium is caused to reject heat to a heat sink at a temperature higher than that of the heat source. Hence the term "heat engine" is intended to include mechanisms which can be driven to pump heat as well as mechanisms which operate as prime movers by converting heat energy into work in the form of useful mechanical motion. The invention can be embodied in both open cycle and closed cycle heat engines utilising external sources of heat energy. In an open cycle engine, a quantity of working medium is inducted into the engine, passed through a thermodynamic cycle, and then exhausted. In a closed cycle heat engine the working medium is retained in the engine following expansion and returned to its original state to begin another operating cycle.

Inasmuch as different thermodynamic working cycles may be effected in embodiments of the invention, depending on the object of the particular embodiment and its mechanical construction, there is no single "best mode" of the invention but rather different best modes for different applications and mechanical constructions. The invention provides a positive displacement rotary heat engine whose ideal thermodynamic cycle of operation includes two constant volume phases in which the temperature of the working medium can be varied over a period of time while the medium is confined within a moving swept chamber of the engine where the medium is heated or cooled recuperatively by heat exchange means conveying heat from or to another swept constant volume chamber of the engine.

The invention is embodied in a rotary engine which employs positive displacement working members and operates approximately in a Stirling cycle, having (1) at least one compression phase in which heat is simultaneously rejected from the working medium to an external heat sink, (2) at least one expansion phase in which heat is simultaneously added to the working medium from an external heat source, and (3) two recuperative constant volume phases in which heat is exchanged between two counterflowing streams of working medium, simultaneously cooling the hotter stream and heating the cooler stream.

COMPARISON WITH PRIOR HEAT ENGINES

The most usual form of regenerator in Stirling cycle and other non-condensing cycle heat engines having reciprocating pistons or other positive displacement working members is that of a mass of finely divided heat storage material through which the working medium passes as it is displaced back and forth between the hot and cold spaces of the engine. A regenerator of such a type is necessarily an unswept volume and although it can be an extremely efficient heat storage and heat exchange device the flow resistance and the relatively large proportion of dead space which it contributes relative to total engine volume inherently limits the specific output and achievable efficiency of conventional engines incorporating such regenerators. The heater and cooler in such engines also typically take the form of thin ducts or tubes which cannot be swept by the working members and which therefore add to the unswept volume of the engine compression space or expansion space. The dead volume in such engines often has a value approximately equal to the maximum swept volume of the expansion space. This condition tends to limit the achievable ratio of maximum cycle pressure to minimum cycle pressure and also to limit total mass flow per cycle through the heater. With all of these limitations, together with those imposed by the geometry of the phase relation between the reciprocating piston and displacer elements in such engines, it is often necessary to pressurize the working medium to a very high degree to achieve satisfactory specific output. Minimum working pressures in excess of 100 atmospheres have been employed in engines of this type. To realize an adequate rate of heat exchange between the gaseous working medium and heat exchanger surfaces and to lessen aerodynamic flow losses through the regenerator in such engines, a working medium such as hydrogen, which is highly combustible, or helium, which is scarce and expensive, has been required. By contrast, in an engine of the invention there is a recuperator instead of a regenerator and the unswept volume in the hot and cold spaces has little or no effect on the compression or expansion ratio of the engine. The transfer duct throat areas can be nearly equal to the face areas of the working members in an embodiment and hence throttling and flow losses caused by flow restrictions in the ducts can be minimal, compared to such losses in reciprocating piston hot gas engines with unswept regenerators, such as so-called Stirling engines.

In the invention, a recuperator provides continuous counterflow heat recuperation in contrast to the intermittent pulsating flow that occurs in the conventional Stirling engine where the regenerator alternately stores and releases heat. Because the regenerator function in the invention is effected by a continuous counterflow heat exchange between two separate swept engine spaces, heat is not primarily stored in a regenerator but rather is continuously transferred by heat pipes in the chamber walls or by conduction through a relatively thin wall separating the two moving constant volume chambers. Consequently, in the invention gas flow in the engine is truly cyclical rather than oscillatory.

In the invention, dead space volume within the engine expressed as a fraction of expansion space volume can be very small. Furthermore in some embodiments, substantially all expansion in the engine is in a swept space where heat is added from an external source and substantially all compression occurs in a swept space where heat is rejected to an external sink. In the conventional hot gas engine with two reciprocating pistons or a piston and displacer this is not practical and some part of the expansion phase necessarily occurs in both the hot and cold spaces, thus lessening the quantity of heat which can be added per pound of working fluid in the engine. Moreover, in the conventional hot gas regenerative cycle engine using reciprocating pistons the regenerator effectiveness is always less than it should be because the regeneration phases never occur at constant volume. In contrast, the heat recuperative phases of the invention can always be constant volume processes, and in further contrast to conventional Stirling or hot gas engines, nearly all of the working medium passes through the heat recuperator rather than only a moderate fraction of it, as in the Stirling type regenerator.

In the invention, the achievable compression and expansion ratio in the engine is greater than that which is practical in conventional hot gas regenerative cycle engines because among other reasons the compression and expansion ratios in an engine of the invention are in some embodiments entirely and in other embodiments almost entirely independent of the proportion of unswept volume to swept volume. This is not true of conventional Stirling engines. Thus it is practical in engines according to the invention to employ comparatively moderate maximum gas densities while still realising an equal or greater heat input per unit mass of working medium during a non-adiabatic expansion phase than is physically possible in a conventional hot gas engine having the same expansion space maximum temperature as the embodiment but greater maximum working medium density and smaller isothermal expansion ratio. This characteristic and the absence of major flow restriction in engines according to the invention make it practical to use a working fluid such as nitrogen as well as hydrogen or helium in an engine with high specific output.

Since engines according to the invention can have rotary rather than reciprocating working members some of the mechanical limitations imposed upon rotational speed by reciprocating mechanisms can be avoided. With the use of rotary positive displacement type working members it is possible to achieve high specific output at relatively low working medium mean densities by increasing engine rotational speed. Relatively high rotational speeds are practical in the invention because of the comparative absence of throttling and other flow restriction losses which are inevitable at high piston speeds in engines using the conventional unswept heat storage regenerator of the Stirling type.

THE DRAWINGS

FIG. 1 depicts the internal arrangement of an embodiment of the invention having concentric annular passages in which orbital pistons partition each passage into a plurality of chambers.

FIG. 1A shows the cross-sectional area of the pistons employed in the FIG. 1 embodiment and permits an appreciation of the considerable difference in volume of the two concentric annular passages.

FIG. 2 shows the construction of a rotor used in the FIG. 1 embodiment where the concentric annular passages are radially spaced apart by an intervening concentric wall.

FIG. 3 shows the construction of a rotor used in an embodiment of the invention where the annular passages are side by side and spaced apart along the axis of the engine rather than being radially spaced apart as depicted in FIG. 1.

Figure 4:
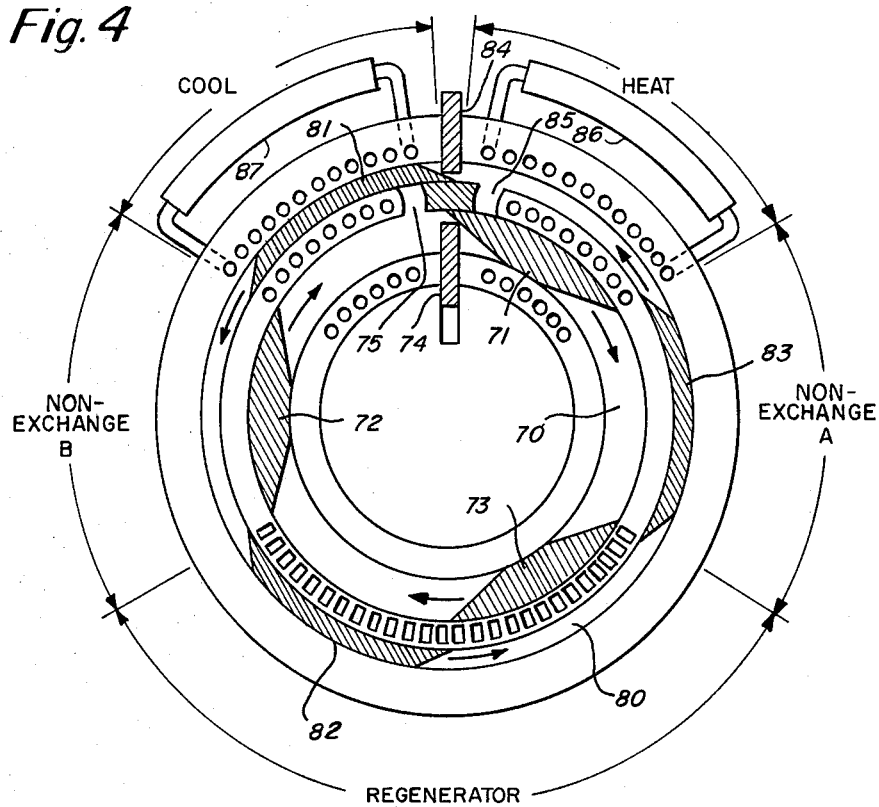
FIG. 4 depicts the internal arrangement of an embodiment having three pistons orbiting in concentric passages which are radially spaced as in the FIG. 1 embodiment.

FIG. 5 schematically depicts an alternative embodiment of the invention that is similar in its mode of operation to the FIG. 4 embodiment.

FIG. 5A schematically depicts the disposition of the heat pipes in the FIG. 5 embodiment.

Figure 6:
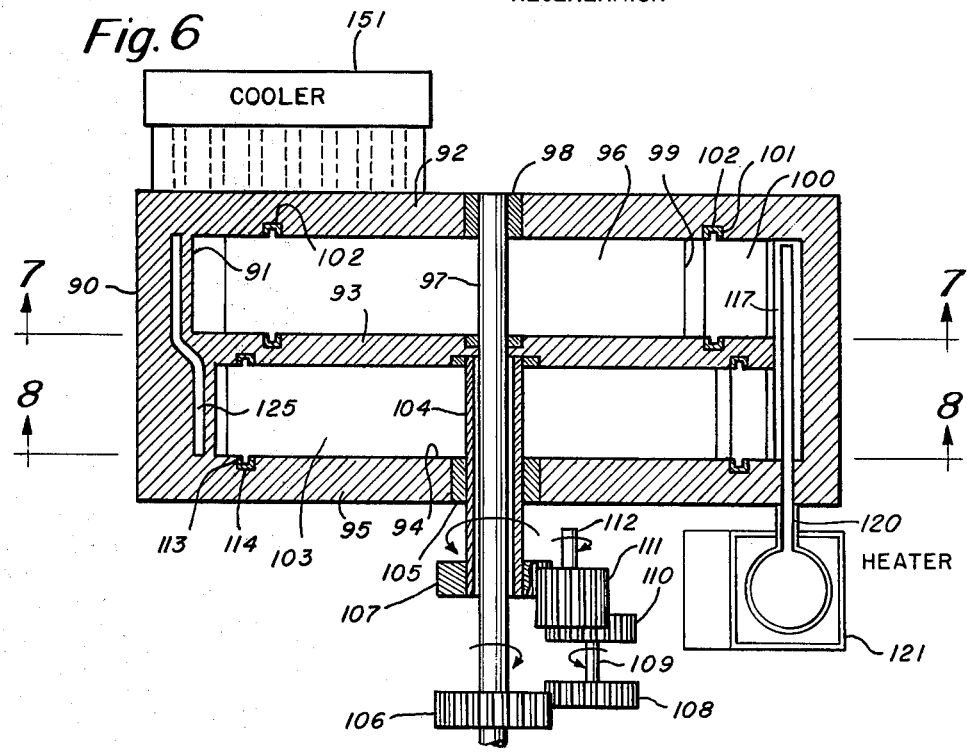

FIG. 6 is a cross-sectional view of an embodiment of the invention having slidable vanes carried by rotors disposed in two side by side cavities.

Figure 7:
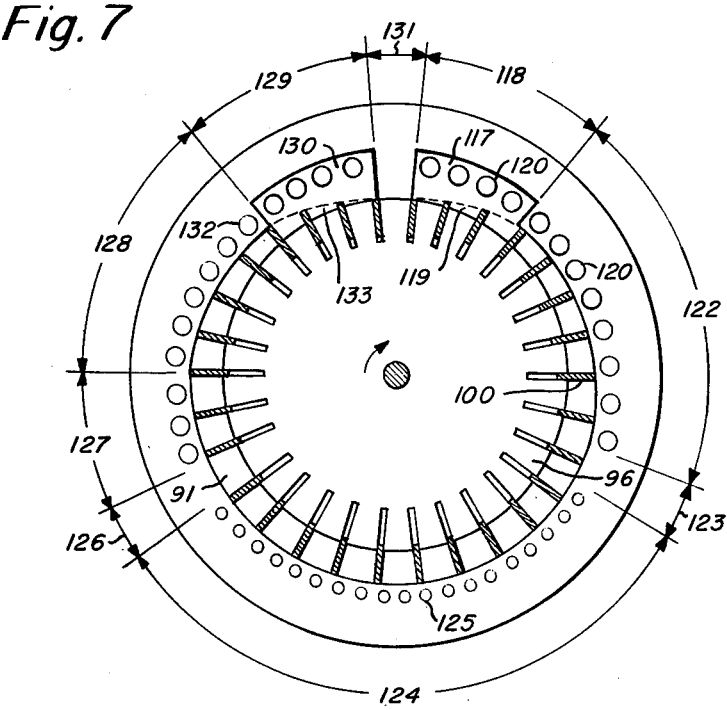

FIG. 7 is a sectional view showing the disposition of the vanes in one of the cavities of the FIG. 6 embodiment.

Figure 8:
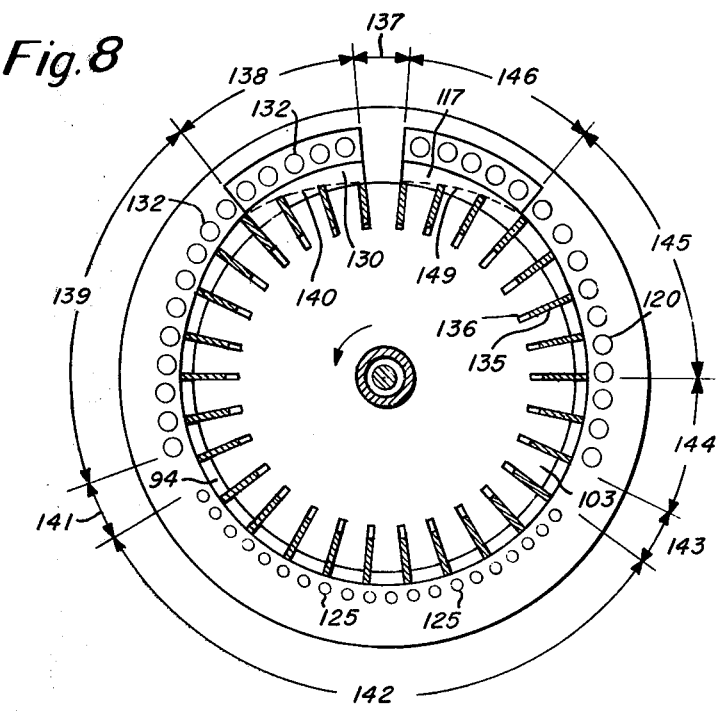

FIG. 8 is a sectional view showing the disposition of counter rotating vanes in the other cavity of the FIG. 6 embodiment.

Figure 9:
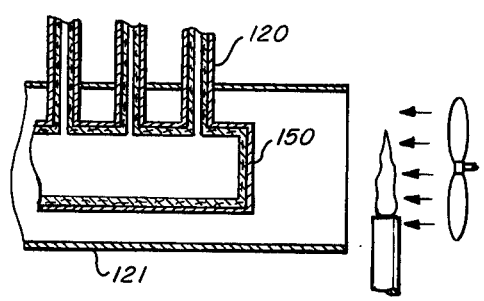

FIG. 9 diagrammatically represents the arrangement of a heater employing heat pipes having a common evaporation chamber.

Figure 10:
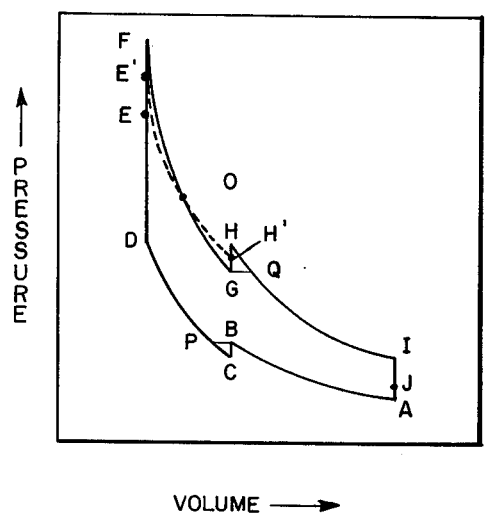

FIG. 10 is a pressure-volume diagram for the FIG. 6 embodiment of the invention.

Figure 11:
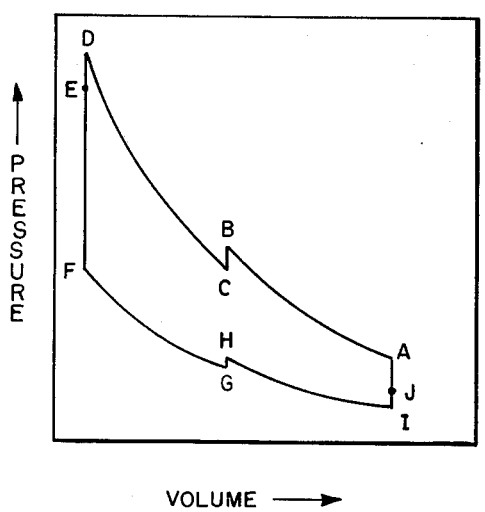

FIG. 11 is a pressure-volume diagram for a heat pump embodiment of the invention.

Figure 12:
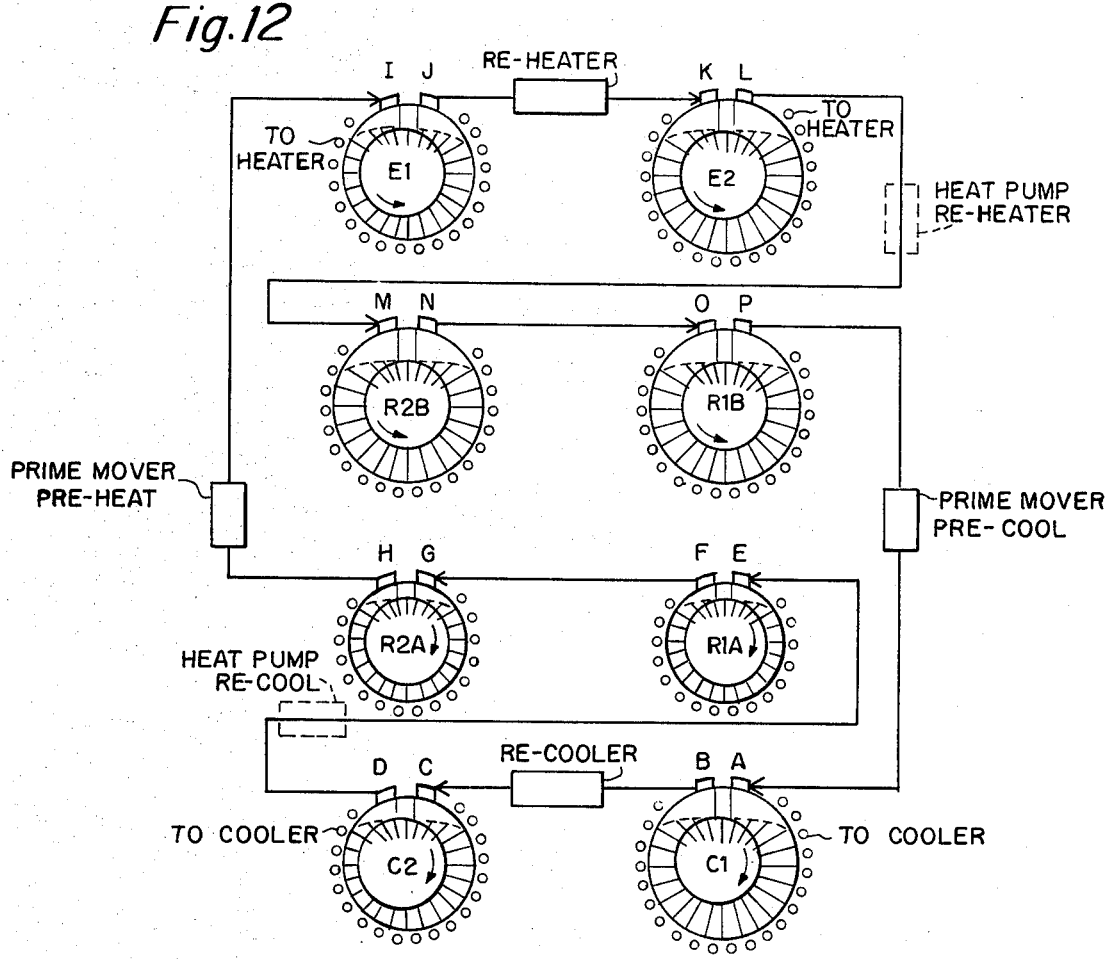

FIG. 12 depicts the scheme of an embodiment of the invention employing eight rotors with each rotor in a different one of eight serially connected cavities.

Figure 13:
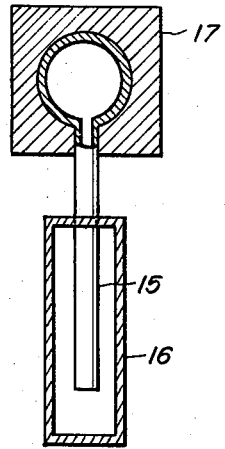

FIG. 13 illustrates an arrangement in which heat pipes are disposed in a transfer duct between chambers.

FIG. 1 depicts the internal arrangement of a closed-cycle, rotary engine embodiment of the invention. In that embodiment, the stator provides two annular passages of rectangular cross-section that are swept by positive displacement rotary piston elements. Each annular passage is formed by an inner cylinder which is concentric with an outer cylinder of larger diameter whereby the annular passage resides between the two cylinders. In the FIG. 1 embodiment, the stator provides two annular passages of unequal volumes in which four rotary pistons are situated. Two of the pistons 51 and 52 are disposed in the inner annular passage 50 and the other two pistons 61 and 62 are disposed in the concentric outer annular passage 60 of smaller volume. At their axial ends, the pistons are connected to revolvable annular rings, here termed flanges, which seal the ends of the annular passages to confine the working medium. FIG. 2 by way of example, shows the pistons 51 and 52 attached to the flanges 54 and 55. Other methods of mounting the pistons and sealing the axial ends can be used.

Within each annular passage is situated a pressure gate 53 or 63. Each gate is arranged to open to allow the piston within each annular passage to pass in its sweep through the passage. The pressure gate is, essentially, a partition which opens to permit the pistons to sweep by and closes immediately after a piston has passed. When a gate is closed, it extends across the annular passage and blocks the flow of the working medium through that passage. The gate remains closed except when it must open to permit a piston to pass in its sweep, after which the gate immediately closes the passage. Pistons 61 and 62 in the FIG. 1 embodiment are assumed to sweep in the counterclockwise direction and pistons 51 and 52 sweep clockwise. For ease of exposition each annular passage is deemed to be divided into three chambers. The inner annular passage (of larger volume) has a constant-volume chamber 50B between pistons 51 and 52, a chamber of increasing volume 50A between gate 53 and the receding piston, and a chamber of decreasing volume 50C between the gate 53 and the approaching piston. Similarly, the outer annular passage (of smaller volume) has a chamber of increasing volume 60A between gate 63 and the receding piston, a constant volume chamber 60B between pistons 61 and 62, and a chamber of decreasing volume 60C between gate 63 and the approaching piston.

Chamber 60C is connected to chamber 50A by a duct 56 and chamber 50C is connected to chamber 60A by a duct 57. Those ducts permit the working medium to be transferred from one chamber to another in the correct sequence during operation of the engine. Chamber 50C and 60A together with duct 57 form a compression stage. Piston 52 moves clockwise in annular passage 50, causing the volume of chamber 50C to diminish and the working medium in that chamber, consequently, is forced through duct 57 into chamber 60A. The maximum volume of chamber 60A is less than the maximum volume attained at any time by chamber 50C. FIG. 1 depicts the position of the rotary pistons nearly at the end of a compression period when chamber 50C is at nearly its minimum volume and chamber 60A is at nearly its maximum volume (viz., the minimum volume of chamber 50C is essentially zero except for the "clearance space" between a pressure gate and a piston necessary in a practical engine). Pistons 52 and 61 sweep an equal number of radians per second but piston 61 sweeps out a smaller volume per second than piston 52 because the distance per second travelled by piston 61 times its cross-sectional area in the plane 1A-1A is substantially smaller than the corresponding product of piston speed and cross-sectional area of piston 52. The pistons in the two annular chambers revolve substantially in phase with respect to the operation of the pressure gates and the two transfer ducts, i.e., pistons 52 and 62 reach gates 53 and 63 at very nearly the same moment, as do pistons 51 and 61. All of the pistons preferably subtend an equal number of degrees of arc and gates preferably start to open at the same time and ducts also preferably are opened and closed by the pistons at the same time.

As pistons 52 and 61 revolve, chamber 50C steadily diminishes in volume while chamber 60A concurrently increases in volume. Total volume of the compression stage constituted by duct 57 and chambers 50C and 60A therefore steadily diminishes, causing working medium to be compressed in 60A with a compression ratio approximately the ratio of the maximum volume of chamber 50C to the maximum volume attained in chamber 60A at the end of that period. A compression period of the stage ends when either piston 51 or 52, approaching gate 53, closes off duct 57. Duct 56 is closed substantially simultaneously with duct 57 by the motion of piston 61 or 62. Gates 53 and 63 open simultaneously to permit pistons 51 and 61 or 52 and 62 to pass. Preferably the arc length of the pistons is long enough so that by the time the passage of piston 61 or 62 begins to open duct 56 at its end in space 60 the motion of piston 51 or 52 will have closed the opening of duct 56 in space 50. In the same way, when piston 51 or 52 begins to reopen duct 57 at its end in space 50 piston 61 or 62 simultaneously closes duct 57 where it opens into space 60, thus preventing loss of efficiency which would be caused if working medium flowed directly between spaces 50A and 60A or between spaces 50C and 60C. Ducts 56 and 57 are opened substantially simultaneously by passage of the pistons, and gates 53 and 63 close simultaneously as promptly as possible behind them. Since leakage of working medium between the end of a gate and the trailing face of a piston can seriously lessen engine efficiency, it is preferable to minimize clearance between the gate end and a piston face during gate closure and to provide seals which will reduce such leakage to a minimum. Any suitable sealing method can be used.

When the gates close and the two ducts again open at substantially the same time, the gas just previously compressed in chamber 60A is then contained in chamber 60B between pistons 62 and 61. As the rotor continues to turn, the working medium moves through the annular passage 60 while confined between the two pistons. In essence, chamber 60B moves in a circular path and transports the confined working medium within it at a constant volume until the leading piston of that chamber next passes the pressure gate and the gate again closes. Reference to FIG. 1 also shows clearly that as a compression phase is occurring, caused by the transfer of working medium out of chamber 50C into chamber 60A as described, an expansion phase producing output work from the engine is occurring simultaneously, as piston 62 displaces working medium out of chamber 60A through duct 56 into chamber 50A. The expansion ratio in this transfer is quite clearly substantially equal to the compression ratio of the transfer of working medium from chamber 50C to 60A. Explanation has already been made as to how working medium which has been compressed in 60A, is then confined in a moving constant volume chamber 60B. Reference to that explanation and to FIG. 1 will show clearly how in a similar manner the working medium which has been expanded into chamber 50A is next confined in a constant volume chamber of the 50B type by the succeeding transit of piston 52 past gate 53.

The FIG. 1 embodiment as shown operates approximately according to the thermodynamic cycle called the Stirling cycle. A coolant is circulated by any suitable means such as a pump through voids 65 to an external heat sink 67 to maintain the stator wall temperature adjacent to the voids 65 lower than the temperature of the working medium in the compression stage comprising spaces 50C and 60A. Working medium in 50C and 60A passing by voids 65 will therefore lose heat to the adjacent wall surfaces during compression and will thus be non-adiabatically compressed, attaining a lower compression temperature than if adiabatically compressed at the same compression ratio from the same initial temperature before compression. Ideally and preferably the heat exchange means employed maintain the temperature of the working medium as near isothermal as practical during compression into 60A. How nearly the compression phase approaches isothermality is a design tradeoff among many factors, such as mass flow and work output rates of the engine, surface volume ratio in the cavities, temperature difference maintained during compression between the working medium and the stator wall interior surfaces adjacent to the coolant voids 65, and total arc length of the cooling sector B. Other heat exchange methods to transfer heat from the compressing working medium to heat sink 67 may be employed. For example, heat pipe means deployed in voids 65 and extending into the heat sink reservoir could be substituted for the circulation method schematically depicted in FIG. 1, as heat pipes can transport heat with great efficiency and require no mechanical pumping means for their operation.

A heating medium circulated by a pumping means through voids 68 in the stator wall in sector A conveys heat from external heat source 66 and thereby causes heating of working medium expanding from chamber 60C into chamber 50A. Thus the working medium expands non-adiabatically and its end temperature at the end of the expansion phase is higher than it would be if allowed to expand adiabatically at the same expansion ratio from the same temperature before expansion. Any other effective heat exchange means can be employed to convey heat from the external source into the walls of sector A, such as heat pipes arrayed in voids 68 and having their evaporation ends extending into the heat source reservoir.

FIG. 1 shows how working medium which has been non-adiabatically expanded in 50A is swept clockwise around cavity 50 while confined in a constant-volume chamber of the 50B type, passing the arc labelled "Recuperator Sector" in the figure. FIG. 1 also shows how working medium which has been non-adiabatically compressed in 60A is afterwards confined in a constant volume chamber 60B and swept counterclockwise around cavity 60 past the recuperator sector arc. The expanded working medium in chamber 50B just starting to enter the right hand end of the recuperator sector, moving clockwise, has a temperature and density different from that of the compressed working medium in chamber 60B just starting to enter the recuperator sector from the opposite direction. If the embodiment of FIG. 1A is operated as a heat pump, the temperature of the working medium in chamber 50B just starting across the recuperator sector will be lower than that of the working medium just starting across the recuperator sector in chamber 60B, but if it is operated as a prime mover, starting temperature of the working medium just entering the recuperator sector will be hotter in 50B than in 60B.

If there are only small pressure differences maintained between the working medium in the two cavities and the material comprising intermediate wall 59 possesses adequate creep strength at the operating temperature of the engine, wall 59 may be made thin to allow counterflow heat exchange through the wall by simple conduction whereby the initially hotter working medium in one cavity is progressively cooled as it moves through the sector by giving off heat which progressively heats the initially colder working medium as it is swept in the other direction in the other cavity.

Figure 1B:
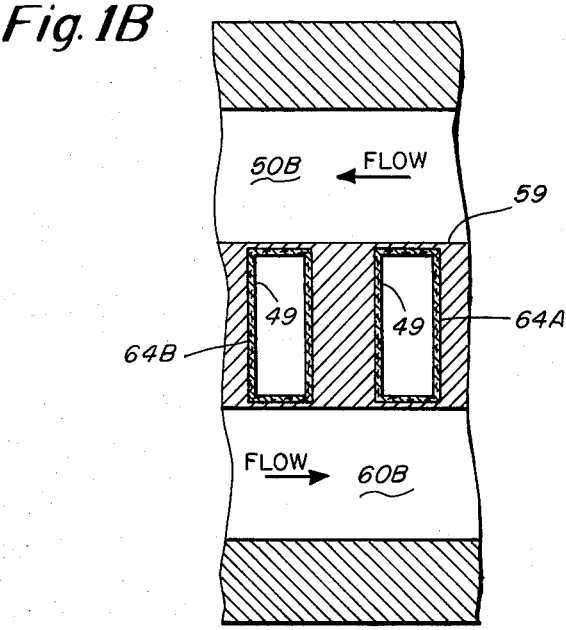
FIG. 1B shows in detail the arrangement of heat pipes in the FIG. 1 embodiment.

However, in embodiments where working medium maximum temperatures and pressures are considerably higher than ambient atmospheric values and pressure differences are relatively large between cavities 50 and 60, it may be necessary to construct intermediate dividing wall 59 with a structural cross section which is too thick to allow a practical rate of heat transfer through the wall by simple conduction. In such embodiments, as in FIG. 1, voids 64 are provided with heat exchange means which can allow rapid rates of heat transfer through wall 59. Heat pipes for example, can be employed. FIG. 1B shows in added detail how two such voids can be constructed as heat pipes. Voids 64A and 64B extend within the thickness of wall 59 almost to the surface of cavity 60 on one side and cavity 50 on the other and the ends of the voids above and below the plane of FIG. 1B are sealed to confine a heat pipe working fluid in each void. Wicking means 49 lines the interior wall surfaces of the voids. During operation of the embodiment the working fluid in the voids exists in a saturated state in which both liquid and gaseous phases of the working fluid are present in a void at the same time.

For purposes of explanation it is assumed in the following description of recuperator operation that in the embodiment shown in FIGS. 1 and 1B the temperature of the working medium just starting to pass by void 64A at its end nearer to constant-volume chamber 50B, flowing from right to left, is hotter than the temperature of the working fluid in a saturated state in void 64A. It is also assumed that the temperature of the working medium in 60B just starting to sweep from left to right by void 64B, at its end nearer to constant volume chamber 60B, is colder than the temperature of the heat pipe working fluid in a saturated state in void 64B. Flow of the working medium in cavity 50 past the face of void 64A heats the wall of the void and causes evaporation of the liquid heat pipe working fluid permeating the wick and consequently also causes a slight drop in the temperature of the working medium in 50B as it passes void 64A. Very soon after it passes across void 64A, the now slightly cooled working medium in 50B sweeps past the face of void 64B and its temperature is in turn reduced still more as it causes evaporation of the saturated working fluid in 64B at a saturation temperature somewhat below that in 64A. In a similar way, the initially colder working medium in constant-volume chamber 60B sweeping from left to right first impinges on the wall surface adjacent the end of 64B next to cavity 60 and cools the wall, causing some of the saturated vapor in the wick of 64B to condense, thus slightly raising the temperature of the engine working medium as it passes across the face of void 64B. As the now slightly hotter working medium in 60B continues its sweep to the right, or counterclockwise, it next contacts the wall surface of void 64A nearer cavity 60 and is further heated in the same manner, acquiring additional heat by condensing some of the saturated vapor confined at a higher temperature in 64A.

It can be easily understood how in this way a heat recuperator can be comprised in an embodiment by providing a much more numerous array of heat pipe voids similar to those in FIGS. 1 and 1B, having their evaporating sides or ends near the constant-volume chambers which sweep a portion of one cavity and having their condensing sides or ends near the constant-volume chambers which sweep a portion of another cavity. Surprisingly, the saturation temperatures of the working fluid in the voids will naturally maintain a sequence of temperatures whereby engine working medium passing the recuperator heat pipe array in one direction in one of the two cavities will be progressively heated while it is confined in a constant volume chamber and the engine working medium passing the heat pipe array in the other flow direction in the other of the cavities will be progressively cooled while it is confined in a constant volume chamber in that cavity. It is also easy to see that the two cavities need not be radially side by side, as shown in the FIG. 1 embodiment, but can be arranged in other ways in which heat pipes or other suitable heat exchange means can be utilized to effect the same method of counterflow heat exchange between two counter-rotating constant-volume chambers in two separate cavities. For example, cavities 50 and 60 could instead be arranged axially one above the other, rather than radially one within the other as shown in FIG. 1. In that case, the condensing and evaporating areas of the heat pipe means would be longitudinally at opposite ends of the pipe voids, rather than transversely on opposite faces as in FIG. 1. When the recuperator in an embodiment employs heat pipes, it is necessary for the operating temperatures of the recuperator to be in a range in which the working fluid or fluids in the heat pipes can exist in the saturated state, because if the heat pipe working fluid rises to a superheated state the pipe can no longer function as an efficient heat exchanger to cool the hotter working medium.

It is apparent that other mechanical arrangements than the one in FIG. 1 can be used to carry out the operating cycle of the embodiment. For instance, rotor cavity 50 of larger net volume could be of larger diameter than cavity 60 and cavity 60 of smaller volume could be disposed concentrically inside of cavity 50 and the rotors could rotate oppositely to the directions shown, if the method of counter-rotation illustrated is used. While an engine can be constructed in which the rotors rotate in the same direction, that arrangement makes piping for the recuperator extremely complex and necessitates placing insulation between the inner and outer rotors to prevent harmful heat exchange between engine areas of different temperatures. When the FIG. 1 embodiment is operated as a Stirling cycle engine the method of counter-rotation insures that engine locations in the two cavities which are in the same axial plane have the same temperature and insulation is required only to prevent unwanted heat loss or gain to the exterior surroundings of the engine and in gates 63 and 53 and stator area 69, where maximum temperature differential exists in the engine.

It is obvious also that besides the radially concentric arrangement of inner and outer annular chambers shown in FIG. 1 an embodiment can be constructed in which the two chambers are disposed axially of each other. In the FIG. 1 embodiment, the rotors are deemed to be as shown in FIG. 2, where the orbital pistons are connected at their axial ends to flanges which seal the axial ends of the annular chamber. It is also feasible to construct the rotors as shown in FIG. 3, where the rotary pistons 45 and 46 are supported at their radial ends rather then axial ends by flanges 47 and 48 which form rotating annular walls to the chambers. In this case the axial ends of the chambers are formed by the axial end plates of the stator, and the pressure gates operate back and forth in the axial direction in slots in the flat end plates, rather than as in FIG. 1 where they operate radially back and forth through slots in the cylindrical casing.

In a conventional hot gas piston engine employing a reciprocating piston and a displacer or two pistons the compression or expansion ratio of the working medium in the engine is difficult to define precisely but the ratio of total system volume when volume of the hot space is minimum to total volume when hot space volume is maximum quite commonly is limited to values less than 2.0 because of the large proportion of unswept volume in the engine and also because of the geometry of the phase relationship between piston and displacer elements, among other reasons. No such limitation exists in engines embodying the invention and the compression ratio and equal expansion ratio of an embodiment can be constructed to be any suitable design value, because the volume of annular space 60 can be made to be any fraction of the volume of annular space 50 by design of the radial width, axial length and circumference of the annular chambers.

Figure 1C:
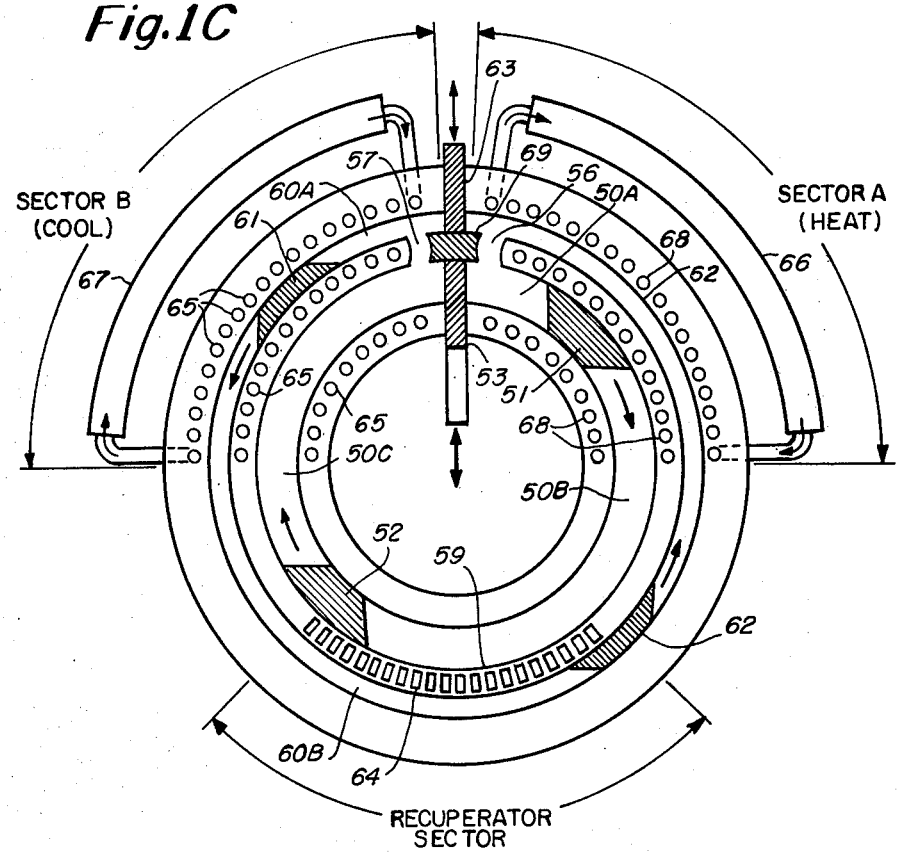
FIG. 1C is a view of the FIG. 1 embodiment with the orbital pistons in positions illustrating the undesirable overlap by the constant volume chambers of the recuperator sector and either heating sector A or cooling sector B.

In the FIG. 1 embodiment efficient operation of the engine may be somewhat lessened from its ideal value because the annular length of the chambers causes working medium in a chamber to overlap between regions having different heat exchange functions. This can be better understood from a consideration of the moment of operation shown in FIG. 1C where the working medium in chamber 50B is then partly in heater sector A and partly in the recuperator sector where its temperature is dropping, causing its pressure also to drop. The fall in pressure causes a fall in the temperature of the medium which is still in the heater sector and the working medium thereby begins to absorb external source heat from the chamber walls, thus reducing the effectiveness of the recuperator in cooling the expanded working medium. A similar loss is caused by the overlap in chamber 60B between cooling sector B and the heating side of the recuperator section. in that case the rise in temperature caused by the constant volume heating of the working medium by the recuperator tends to cause a rise in temperature of the working medium in the portion of 60B which overlaps cooling sector B, and some heat from the recuperator is thus lost to the exterior heat sink through cooler 67 rather than used to increase the internal energy of the compressed working medium.

FIG. 4 depicts in cross section an embodiment in which loss in thermal efficiency caused by overlapping of working medium between the regenerator and cooler is prevented, i.e., the working medium in any chamber is not simultaneously partly in a regenerator space and partly in an externally heated space or an externally cooled space, In the FIG. 4 embodiment pistons 71, 72 and 73 are carried by a rotor that is assumed to turn in the clockwise direction and pistons 81, 82 and 83 are carried by a rotor turning in the opposite direction at the same speed of rotation. Thus as pistons 71, 72 and 73 orbit clockwise in passage 70, pistons 81, 82 and 83 simultaneously orbit counterclockwise within the passage 80. The two passages are connected by ducts 75 and 85 on opposite sides of gates 74 and 84. As in the FIG. 1 embodiment the gates are situated to block the passages and each gate opens to permit a piston to pass and then immediately closes to block the circular passage again. In the FIG. 4 embodiment, the three pistons of each rotor are symmetrically disposed within the passage and because each piston covers an arc of 60° the spacing angle between pistons is also an arc of 60°. Heater 86 heats the chamber walls of the heating arc in spaces 70 and 80. In the cooling arc cooler 87 conveys heat from the chamber walls of spaces 70 and 80 to an external heat sink. The heating arc and the cooling arc extend over a maximum angle of 60°. Non-exchange section A subtends an angle of 60° beyond the heating arc and non-exchange section B subtends an angle of 60° beyond the cooling arc. The non-exchange sections are not provided with heat exchange means within the radial cross section of the chamber wall surfaces, hence working medium in the non-exchange sections gains or loses heat primarily only by conduction to the atmosphere surrounding the engine. The engine casing is preferably heavily insulated in all areas where engine temperature differs from ambient temperature. Since the angular length of the non-exchange sections equals the separation angle between any two pistons of the embodiment, it is apparent that the working medium contained in a constant-volume chamber between any two pistons cannot overlap between the heater and the regenerator space or between the cooler and the regenerator spaces. However, a small amount of overlap can be allowed between heat-exchange areas since a small overlap will put the working medium in a chamber in simultaneous contact only between the heater arc and the hottest section of the recuperator or with the cooling arc and the coldest section of the recuperator and very little unwanted heat exchange will occur because the temperature differences are small in these cases.

Embodiments can be constructed without this kind of overlap if non-exchange arcs equal in length to the separation angle between pistons are incorporated in the annular wall spaces so as to maintain wall areas having little heat exchange capacity interposed between the heating or cooling arc sections and the recuperator. The maximum possible recuperator length in an embodiment without overlap can be expressed algebraically by the formula $L_{max} = 360° - (2s + c + h)$, where $L_{max}$ is the maximum recuperator angular length without overlap, s = the angular separation between pistons, c = the angular length of the cooling arc measured from the center line of the pressure gate and h = the angular length of the heating arc measured from the center line of the pressure gate. Thus, in FIG. 4 s, c and h each equals 60° and $L_{max} = 360° - (120° + 60° + 60°) = 120°$.

In the FIG. 4 embodiment the angular length of the chamber wall sections which are directly heated or cooled by exterior source heat exchange means is equal to the angular separation between pistons, but in some embodiments it may be preferable to extend the recuperator angle and shorten the heating arc angle or the cooling arc angle or both. The required wall surface area for the heater or cooler or recuperator is a function of a number of variables such as maximum output requirement, temperature of the heat source, temperature of the cooling means, compression ratio of the embodiment, the coefficient of conductivity in the recuperator. In any embodiment utilizing a compression or expansion method involving a transfer from one cavity to another the maximum length of the heating arc section or cooling arc section is preferably not greater than the piston separation angle, because the maximum length in degrees of the expansion or compression phases can only equal the piston separation angle in such embodiment. In general, as the compression ratio is increased in an embodiment utilizing non-adiabatic expansion and compression and a constant volume recuperator, the heat-exchange requirement for the expansion and compression heat exchange areas increases relative to the heat-exchange requirement for the recuperator heat exchange wall sections.

Embodiments can also be constructed with more than three pistons per rotor. An embodiment with five 36° pistons per rotor and 36° separation angles between pistons, and 36° heating and cooling section angles can have a maximum regenerator length without overlap of 220°. Any suitable means of coordinating the rotation of the rotors, operating the pressure gates and transmitting motive power from or to an embodiment may be used. Rotors of other suitable forms than those shown in FIG. 4 may be used, and the rotors may be disposed in other arrangements than that one.

FIG. 5 schematically depicts a variation of the three piston per rotor embodiment illustrated in FIG. 4. In the FIG. 5 embodiment the rotors are in cylindrical cavities 20 and 30 that are one above the other as indicated in FIG. 5A. Thus, the cavities are spaced along the longitudinal axis A—A of the engine on opposite sides of a dividing wall 29. The upper drawing in FIG. 5 is taken along the parting plane B—B of FIG. 5A whereas the lower drawing of FIG. 5 is taken along the plane C—C. As indicated schematically in FIG. 5, the rotor 21 turns in the clockwise direction within cavity 20 whereas the rotor 31 turns counterclockwise within adjacent cavity 30. Rotor 21 has three integral pistons 22, 23, 24 which are actually lobes symmetrically arranged around the rotor. The gate 25 is arranged to ride upon the surface of the rotor 21 and act as a barrier to prevent working medium from being carried completely around in one revolution of the rotor. The gate 25 retracts completely to permit a lobe to pass and then immediately extends into the space between the lobes to form a blockage. Similarly, a gate 35 in cavity 30 rides upon the surface of rotor 31 which has three lobes 32, 33, and 34 symmetrically disposed around it. Ducts 36 and 37, adjacent to and on opposite sides of the gates, connect cavity 20 with cavity 30 to permit working medium to be transferred from one cavity to the other. Recuperator heat pipes 26 adjacent to the cylindrical wall of each cavity extend from one cavity to the other, as illustrated in FIG. 5A. Those heat pipes are situated in a recuperator sector, and cause heat to be exchanged between the working medium in the two cavities, in the manner previously described. Heating pipes 27 are situated adjacent to the cavity walls in a heating sector and cooling pipes 28 are similarly situated in a cooling sector. As in the FIG. 4 embodiment, the heating pipes of the FIG. 5 embodiment are connected to an external heat source 38 and the cooling pipes are connected to an external heat sink 39 where heat is absorbed.

The operation of the FIG. 5 embodiment does not differ in any essential respect from the operation of the FIG. 4 embodiment. In the FIG. 5 embodiment, passages analogous to passages 70 and 80 of the FIG. 4 embodiment can be viewed in the FIG. 5 embodiment as being formed between the peripheral wall of the cavity and the surface of the rotor with the three lobes being the equivalent of the three pistons in the FIG. 4 embodiment. That is, one of the two concentric cylinders forming the passage can be considered to be connected to the rotor so as to turn with it. The wall through which the gate protrudes must, of course, be stationary.

All the previously described embodiments with gates or abutments have working periods when compression and expansion phases are simultaneously in progress alternating with non-working periods when the transfer ducts are masked and the gates are open for pistons to pass. An embodiment with two pistons per rotor has two working periods per revolution, and so on. The torque exerted by an embodiment of the FIG. 1 or FIG. 4 type becomes zero during the non-working periods unless two or more such embodiments are connected to the same drive shaft.

FIG. 6 depicts an embodiment which exerts a continuous positive torque on the output shaft when operated as a prime mover. The embodiment has an outer casing 90 providing a cavity 91 having an axial end wall 92 and parallel intermediate wall 93. On the other side of wall 93 a similar cavity 94 has a parallel end wall 95. Cavity 91 houses a cylindrical rotor 96 having axial ends fitting nearly against end wall 92 and intermediate wall 93 to limit gas leakage past the axial ends. Additional seals may be provided. Rotor 96 revolves concentrically on a shaft 97 which journals in bearings 98 in walls 92 and 93. Vane pockets 99 in the rotor house radially slideable vanes 100. Cam followers 101 project from the axial end surfaces of vanes 100 into cam grooves 102 in the axial surfaces of walls 92 and 93 and these cam followers cause the vanes to slide radially inward or outward as the rotor rotates to maintain the outer ends of the vanes in the proper sealing relationship to the peripheral wall surface. Rotor 103 revolves concentrically on a hollow shaft 104 which journals in bearings 105 in axial walls 93 and 95. Shaft 97 is concentric with shaft 104 and extends through it. A gear 106 is fixed on shaft 97 and a gear 107 of equal diameter and number of teeth is fixed on shaft 104. Gear 106 meshes with gear 108 on a secondary shaft 109 which is provided with a gear 110 of equal diameter to gear 108. A gear 111 on a tertiary shaft 112 meshes with the gear 107 on shaft 104, thereby causing rotors 96 and 103 to revolve oppositely and at the same speed. Any other suitable method for maintaining counter-rotation may be employed. Cam followers 113 projecting from opposite ends of the vanes contact camming surfaces of cam grooves 114 in the axial end walls of the cavity and operate the vanes radially inward and outward as the rotor revolves on the shaft. Any other suitable vane operation method may be used.

FIG. 7 is a transverse section showing the rotor 96 housed in cavity 91. Rotor 96 as viewed in FIG. 7 is assumed to revolve in the clockwise direction. Slideable vanes 100 in pockets 99 extend axially between axial end surfaces 92 and 93 and the radially outward ends of the vanes sweep in touching or nearly touching relationship to the peripheral wall of the cavity 91, thereby forming a plurality of substantially separate mutually sealed moving chambers between adjacent pairs of vanes. The volume of each chamber varies with the variation in the radial distance between the outer peripheral surface of the rotor and the inner peripheral surface of the cavity. Any practical sealing method may be used to seal the chambers. A lubricant may be used. The purpose of seals is to prevent excessive leakage between chambers. Seals need not be employed if the clearances between the moving vane ends and the cavity surfaces are small enough to limit leakage to a tolerable percentage of cavity volume moved per cycle. Other obvious methods of limiting leakage which can be employed are those of minimizing the pressure difference between chambers and of limiting the leak time by increasing the engines's rotational speed. This is feasible in the heat pump embodiments, for example, where maximum pressure and the expansion-compression ratio can both be limited to fairly low values but where rotational speed can be increased to keep heat exchange per unit time at a desired rate.

Cavity 91 provides peripheral wall area 118. Duct 117 communicates between area 118 in cavity 91 and area 146 in cavity 94, permitting the gaseous working medium to be admitted into area 118 from cavity 94. The dotted line 119 in FIG. 7 indicates the approximate path of the ends of vanes 100 moving through the segment bounded by 118. Heat pipes 120 in duct 117 and within the peripheral stator wall of area 118 convey heat to the working medium in the chamber at the upper working temperature of the engine from an external heat source such as heater 121. Duct 117 and area 118 provides a re-heat chamber of constant volume. Peripheral wall section 122 of increasing radius lies adjacent to area 118 in the downstream (clockwise) direction. Area 122 constitutes a secondstage high temperature expansion area. Heating means 120 within the peripheral casing wall of 122 maintain the temperature of the wall segment 122 above the gas expansion temperature $T_e$, the lowest temperature reached in expansion by the working medium. The radius of the cavity in area 122 increases in the downstream (clockwise) direction, thereby causing the working medium in the chambers moving through that segment 122 of the cavity to be expanded and work to be done by the working medium. A non-exchange area 123 with no heat-exchange means incorporated in the casing wall lies between area 122 and recuperator area 124. Area 123 subtends an angular arc approximately equal to the angular separation between two adjacent vanes of rotor 96 and working medium is thus prevented from contacting the heater and the recuperator simultaneously. Recuperator area 124 contains heat pipes 125 in the casing wall. These heat pipes extend across the axial length of cavity 91 and cavity 94, as shown in FIG. 6.

Areas 123 and 124 are constant-volume areas, in which the radius of the cavity is constant and the radial distance between the outer cylinder surface of the rotor 96 and the cavity periphery remains substantially constant. A slight variation in cavity radius in area 123 is permissible to effect a smooth transition between curvature of the wall in expansion section 122 and the substantially constant radius area 124.

Downstream (clockwise) of recuperator area 124, adjacent area 126 contains no heat pipes or other heat-exchange means. The angular arc subtended by 126 is approximately the angular separation between two adjacent vanes of the rotor 96 to prevent overlapping of working medium between the recuperator and external cooling area 127. The cavity radius in areas 126 and 127 is substantially constant and equal to the radius of area 124.

A low temperature first stage compression area 128 lies downstream of area 127. Coolant voids 132 in the peripheral cavity wall of areas 127 and 128 contain heat exchange means which preferably cause cavity wall temperature in these areas to be as nearly uniform as possible at a temperature substantially below the temperature which would be attained by the working medium if it were compressed adiabatically. Compression of the working medium is non-adiabatic.

Area 129 lies just downstream of area 127. Duct 130 opening into area 129 preferably has a net flow area approximately equal to the flow area of the cavity at the downstream end of area 128, thereby ensuring that working medium flowing out of cavity 91 through the duct into cavity 94 will be subject to little if any throttling due to a restriction in the flow area. Coolant pipes 132 in the periphery of wall sections 129 and 138 and in duct 130 provide intercooling at constant volume of the working medium flowing through area 129 and duct 130. Area 129 is terminated by a seal area 131. The radius of the wall surface of area 131 is only very slightly greater than the radius of the rotor 96 to minimize as much as possible the passage of the working medium around the periphery of the cavity between the rotor surface and the peripheral wall surface of area 131. Additional sealing means may be employed to improve sealing. The working medium entering section 129 is thus forced out of cavity 91 through duct 130 into cavity 94. Dotted line 133 indicates the approximate path of the ends of vanes 100 as they are retracted during their sweep through area 129.

FIG. 8 is a transverse section showing rotor 103 housed in cavity 94. Rotor 103, as viewed in FIG. 8 revolves counterclockwise, oppositely to rotor 96. Radially slideable vanes 135 in pockets 136 extend axially between cavity end surfaces (at wall 93 and end wall 95) and their radially distal ends revolve in touching or near-touching relationship to the peripheral wall of the cavity to minimize gas leakage between the separate chambers. The volume of each chamber varies with the variation in the radius of the peripheral wall of cavity 94 as the chamber rotates in the cavity. Duct 130 in intermediate wall 93 admits working medium from cavity 91 into constant-volume transfer area 138 of cavity 94. To minimize throttling loss the flow area of area 138 at its downstream end approximately equals the flow area of area 129 at its upstream end in cavity 91. The volume per second which is swept counterclockwise out of space 138 equals the volume per second which is entering space 129 in cavity 91 and the volume of the working medium is therefore substantially constant throughout its residence in these two engine spaces although its pressure may vary. In this radial vane embodiment, the axial lengths of the two rotors and the radial widths of spaces 138 and 129 are equal and the rotors counter-rotate at the same angular speed. However, it is obvious that any two or all three of these factors (viz., rotor lengths, chamber radial widths and speeds of the two rotors) can be unequal in an embodiment and the volume rate entering section 129 and leaving section 138 can still be equal if the products of the three factors are equal. In order to prevent throttling of the intake of a chamber in section 138 the opening of duct 130 should extend to or beyond the point where the radially distal ends of the vanes have reached the point of sealing relationship with respect to the cavity peripheral wall in section 138. Heat exchange means 132 within the peripheral wall maintains the wall temperature in area 138 well below the temperature the working medium would attain in adiabatic compression.

Preferably, there is a uniform wall temperature maintained in sections 127, 128, 138, 139 and duct 130. Dotted line 140 in FIG. 8 depicts the approximate path of the outer ends of vanes 135 as they sweep counterclockwise through area 138.

Downstream of area 138, area 139 preferably provides a second compression state, in which the radius of the cavity decreases smoothly to a minimum. Cooling means 132 in the peripheral wall of area 139 cause the working medium to be cooled during compression. The compression ratio reaches its maximum value in the cycle at the downstream end of 139 where the chambers attain their minimum volume. It is also permissible for all compression and expansion in an embodiment to be done in cavity 91. When this is the case, cavity 94 can have a constant radius, except for the seal area 137. This method provides some advantages in sealing because the vanes in cavity 94 can then have radiused ends which would conform to the radius of the peripheral wall. Further, it is less expensive to make a circular cross-section chamber than one which has varying radii.

However, when all compression and expansion is performed in one cavity the only heat exchange function of the second cavity is to contain one branch of the recuperator and this arrangement therefore reduces the wall area available for heat exchange in the embodiment and limits the specific output of the engine compared to the FIG. 6 embodiment.

Downstream (counterclockwise) of area 139, non-exchange area 141 of constant wall radius subtends an angle approximately equal to the separation angle between two adjacent vanes. Downstream of area 141 constant-volume recuperation area 142 has heat pipes 125 in the peripheral casing wall. These heat pipes extend axially the lengths of cavities 91 and 94, and transfer heat from cavity 91 to cavity 94, causing the temperature and pressure of the compressed working medium which is swept counterclockwise through constant volume area 142 to rise. Downstream of recuperator area 142, a non-exchange area 143 of constant cavity radius equal to the cavity radius of 142 subtends an arc approximately equal to the angular separation between two vanes to limit overlap of a chamber between the heating section 144 and the recuperator. The condensing ends of heat pipes 120 are contained within the peripheral casing in areas 144, 145, 146, 118 and 122 and in duct 117. These heat pipes convey heat from the external heat source, heater 121, to maintain the temperature of the wall surface in those areas above the temperature reached by the working medium when it just passes area 142. This wall temperature may vary because different engine speeds will alter the rate of energy conversion in the engine, but it is preferable at any given speed of rotation to maintain the wall temperature in the expansion sections as uniform as possible and in a prime mover embodiment at as high a temperature as practical. FIG. 9 shows the evaporation ends of heat pipes 120 connected to a common evaporation chamber 150 in heater 121, causing the saturation pressure and temperature of the heat pipe fluid to be uniform in the condensing ends of the heat pipes and thus achieving substantially uniform cavity wall temperatures in sections 144, 145, 146, 118, 122 and in duct 117. Downstream of area 143, constant-volume section 144 provides a reheat phase in which working medium which has been partially reheated in regenerator section 142 is raised to a still higher temperature by the heating pipes 120 which obtain their heat from the external source 121. Downstream of area 144, area 145 of increasing radius provides a first expansion stage in which the heat pipes 120 maintain the working medium temperature at a value higher than it would have if expanded adiabatically, preferably as nearly isothermal during expansion as may be practical. Downstream of area 145, constant-volume area 146 also has heat pipes 120 in the peripheral cavity wall to maintain the working medium nearly at the expansion temperature in 145 or to reheat it nearly to the temperature which it had reached just prior to expansion in 145 if it has dropped below that temperature. Duct 117 (FIG. 6) in intermediate wall 93 communicates between section 146 of cavity 94 and cavity 91. Section 146 (FIG. 8) is terminated downstream (counterclockwise direction) in cavity 94 by seal section 137, preventing further flow of the working medium around the cavity 94. The working medium entering section 146 therefore must flow through duct 117 into section 118 of cavity 91 thus ending one complete cycle. Throttling of the flow of working medium in the duct 117 during this transfer can be minimized if that duct is made to have a flow cross-section at least equal to the flow cross-section at the upstream point of area 146. Dotted line 149, in FIG. 8, depicts the approximate path of the outer radial ends of vanes 135 as they retract inwardly during their sweep through section 146.

In the operation of the FIG. 6 embodiment of the invention, a first compression phase is performed in cavity 91 (FIG. 7) as the gaseous working medium is swept clockwise through area 128. Because the radius of the cavity in area 128 steadily decreases in the clockwise direction, the working medium is compressed between the cavity's peripheral wall, the rotor cylinder, the radial vanes and the axial end walls as the radial distance between the rotor and the cavity wall steadily diminishes. The coolant means in voids 132 carries heat to a cooler 151 and thereby maintains the wall temperature of area 128 at some temperature well below the adiabatic compression temperature of the medium so that the medium gives off heat to the wall surface as it is compressed. Preferably the working medium temperature is nearly isothermal in the compression phase. By employing many vanes on the rotor, the pressure difference between chambers can be minimized to minimize gas leakage between chambers. Wall area 129 is downstream of area 128. The cooling means 132 maintains the peripheral wall in area 129 at a temperature somewhat below the lowest design compression temperature of the cycle. If the temperature of the working medium entering area 129 is above the wall temperature in that area, the working medium will lose heat to the wall in a stage of intercooling between the first and second stages of compression. Essentially no further compression is accomplished within area 129. Duct 130 in intermediate wall 93 communicates between area 129 and area 138 of cavity 94. As each chamber enters section 129 its vanes are retracted radially inwards by the camming surfaces of cam grooves 102 which control the radial position of the vanes by means of the cam follower studs on the vanes. Seal area 131 terminates area 129 and prevents flow of the working medium clockwise between the seal and the periphery of the cylindrical rotor. The working medium entering section 129 is therefore forced out of cavity 91 through duct 130 into section 138 of cavity 94.

Rotor 103 rotates oppositely to rotor 96. As they sweep counterclockwise through section 138 the vanes of rotor 103 are moved radially outward by cam follower studs 113 moving in cam grooves 114. Dotted line 140 shows the approximate path of the outward ends of the vanes as they emerge from seal area 137 and are extended into sealing relationship to the peripheral wall to form chambers which move counterclockwise around cavity 94. Seal section 137 prevents clockwise flow of working medium entering cavity 94 through duct 130 and working medium is therefore constrained to move counterclockwise around cavity 94 with the rotation of rotor 103.

Preferably, any just-sealed chamber leaving area 138 has the same volume as any just-opening chamber entering area 129 and an equal number of chambers enter one area and leave the other in an equal time, thus causing the total volume contained in areas 129, 138 and duct 130 to remain substantially constant as the engine operates. Alternatively, the volume per chamber entering and leaving the two areas need not be constant if the product of volume per chamber times chambers per unit time is the same for both the entering and leaving chambers, thereby also keeping the total volume substantially constant. Slight differences are permissible in the volume rate of working medium entering a transfer area on the upstream side of a duct and leaving the transfer area on the downstream side of the duct. Such differences need cause only slight difference in the work per cycle of the engine. In the pressure-volume diagram of FIG. 10, for example, if a slightly smaller volume continuously leaves area 138 than enters area 129 the loss in cycle work is only the small area BCP. Work area of the pressure-volume diagram could actually be slightly increased if the volume rate leaving the transfer area 138 is slightly greater than the volume rate entering transfer area 129.

Heat pipes 132 transfer heat to cooler 151 from the wall surface of sections 127, 128, 129, 138, 139, and duct 130. Since these wall temperatures are maintained below working medium compression temperature the working medium will continue to be cooled while it is in duct 130 and in section 138 to approximately its temperature at the start of the first compression stage. Continued rotation of rotor 103 moves the working medium out of section 138 into section 139 of diminishing cavity radius. Section 139 forms a second stage of compression of the working medium as the radial distance between the rotor and the cavity wall steadily diminishes in the direction of rotation. Working medium is continuously cooled during both first and second compression stages by forced convection in contact with the peripheral cavity wall sections which are cooled by cooler 151 and heat pipes 132. The uniformity of wall temperature in these sections assists in maintaining the compression temperature of the working medium approximately constant or at least well below the temperature it would attain if compressed adiabatically.

Counterclockwise of section 139, wall section 141 of approximately constant radius contains no heat exchange means in the peripheral wall of the cavity. This section subtends an arc approximately equal to the separation between two adjacent vanes of the rotor. The non-exchange section prevents overlap of working medium in a chamber between the ideally isothermal compression section 139 and the recuperator section 142 at steadily changing temperature. This minimizes undersirable heat exchange between the recuperator and the exterior heat sink which could reduce recuperator efficiency and increase compression work. By referring to FIG. 8, it can be seen that a chamber cannot overlap the recuperator and cooling sections at the same time.

The compressed working medium next enters recuperator area 142 of constant radius downstream of area 141. Heat pipes 125 contained within the thickness of the peripheral cavity wall of area 142 exchange heat with the cavity wall causing wall temperature in a prime mover embodiment to rise progressively in a gradient in the direction of rotation and the working medium passing through section 142 is therefore heated at a constant volume to a higher temperature and pressure, since the volume of the chambers between vanes does not change in the recuperator area.

Upon leaving recuperator area 142, the working medium passes into area 143 subtending an arc approximately equal to the separation angle between two adjacent vanes. No heat exchange means are contained within the peripheral cavity wall in this section but the working medium in this section continues to receive heat from the heat pipes 125 of the recuperator until the trailing vane of a chamber passes the downstream end pipe of the recuperator. Downstream (counterclockwise) of section 143 a constant-radius area 144 provides a reheating phase in which the volume of the compressed working medium which has been heated just previously in recuperator area 142 remains constant as it is heated to a still higher temperature before it is expanded. Heat pipes 120 from heater 121 maintain the cavity wall temperature in section 144 at approximately the same temperature as section 145 in cavity 94 and sections 122 and 118 in cavity 91. The radius of the peripheral wall of 144 is substantially constant and equal to the radius of sections 142 and 143 but may increase slightly in the downstream direction to effect a smooth transition with section 145.

Section 145 provides a first expansion stage. The radius of the peripheral cavity wall increases in the direction of rotation and the working medium consequently expands and produces mechanical work at the shaft. Heat pipes 120 contained within the wall of the cavity convey heat to the wall from the external source 121 to maintain the wall temperature well above the temperature of adiabatic expansion at the expansion ratio of that stage and consequently the working medium acquires heat energy from the cavity wall as it expands. Preferably the heat exchange capacity of the heater 121 should be sufficient to maintain the temperature of the expanding working mediun isothermal or nearly so. It is, of course, apparent that other means for conveying the heat to the cavity walls can be employed in place of the heat pipes.

FIG. 10 is a pressure-volume diagram for the FIG. 6 embodiment of the invention when used as a prime mover. The first compression phase is indicated by line AB and is followed by interstage cooling at constant volume as indicated by line BC. The second compression phase indicated by line CD then ensues. Following compression, the working medium is heated at constant volume by the recuperator as indicated by line segment DE. A reheat phase at constant volume, indicated by line segment EF, then occurs in which heat is added from an external source and the working medium reaches its highest pressure in the cycle at point F. The first expansion phase is indicated by line FG and is followed by heating at constant volume as indicated by line GH. The second phase of expansion is indicated by line HI. The working medium, following the last expansion stage, is cooled at constant volume by the recuperator as indicated by line segment IJ. Before the start of the next compression phase, the working medium is further cooled at constant volume by removal of heat to an external cooling source as indicated by line segment JA and the pressure is brought back to lowest pressure in the cycle at point A.

It is possible to eliminate the constant-volume reheat section 144 in cavity 94 in the construction of an embodiment and instead to extend the recuperator area arc or the expansion area arc, or it is permissible to substitute a constant-volume reheat section for the first expansion stage area 145. It is necessary, however, to increase the recuperator arc in both cavities if it is to be increased in one of them, because the recuperator arc in one cavity should be substantially congruent with the recuperator arc in the other cavity. Dotted line E' H' in FIG. 10 shows schematically the pressure change during a non-adiabatic first expansion stage, if the constant-volume reheat phase represented by line segment EF is eliminated and the first-stage expansion area arc and recuperator arc are accordingly increased. Although work area E'FO is seen to be lost from the top of the diagram a small additional work area H'GO is gained at the bottom of the expansion curve because the increase in expansion heat-exchange surface area allows the expansion to be more nearly isothermal and thus reduces the pressure drop during expansion. An embodiment could also be constructed with only one expansion and one compression phase, with a constant-volume recooling phase performed in the expansion cavity after the expanded medium has been cooled in the recuperator and a constant-volume reheating phase in the compression cavity after the compressed medium has been heated in the other branch of the recuperator. This embodiment could have an advantage in construction in that each cavity can have a single constant radius of curvature except in the expansion or compression area of the cavity.

Section 146 provides a constant-volume stage or phase in which heat pipes 120 conveying heat from heat source 121 can reheat partly expanded working medium. Working medium volume is substantially constant in this section. An exhaust duct 117 in intermediate wall 93 communicates between section 146 of cavity 94 and section 118 of cavity 91. Since the volume per second entering area 146 equals the volume per chamber leaving zone 118, the total volume of areas 118, 146 and duct 117 remains essentially constant.

Volume, heat exchange surface area and net cross sectional flow areas of the ducts between cavities can be made as large as necessary to obtain excellent interheating and inter-cooling of the working medium but without imposing throttling losses due to restrictions of flow area. This is caused by the property of the FIG. 6 embodiment that the attainable compression and expansion ratio in the engine are not affected by the unswept volumes in the ducts or the transfer areas within the cavities at the ends of the ducts. In conventional Stirling engines the dead volume always forms part of the compression or expansion space in the engine. The ratio of dead volume to swept volume therefore has an important influence on the compression ratio in those engines, and the unswept volumes of the regenerator, heater and cooler must be limited in order to obtain sufficient volume variation for effective operation of the Stirling engine.

Seal section 137 prevents further counterclockwise rotation of the working medium around cavity 94. Dotted line 149 in FIG. 8 illustrates the approximate path of the ends of vanes 135 as they are retracted into the vane pockets 136 while moving through area 146. Volume need not be exactly constant in this transfer. Area BCP in FIG. 10 represents the small work loss per cycle caused by a small volume change resulting in a constant pressure transfer.

The working medium flowing through duct 117 emerges in section 118 of cavity 91 (FIG. 7). Rotor 96 rotates clockwise, oppositely to rotor 103, and vanes 100 are operated radially outwards as soon as they pass beyond seal section 131, as depicted by dotted line 119. The working medium flows into cavity 91 and enters the spaces between the vanes. A chamber is closed when the trailing vane of a pair passes the downstream edge of area 118 and both vanes have reached sealing relation with the peripheral wall. As the working medium flows through duct 117 and zone 118 at constant volume it remains in contact with stator wall surfaces which are heated by the heater 121. If the working medium temperature fell slightly during its first expansion stage in section 145 it is reheated to a higher temperature while in the constant-volume transfer areas 146, 118 and in duct 117.

Area 122 of increasing radius provides a second expansion stage. As the working medium expands it continues to be heated by heat pipes 120 in the peripheral wall. As working medium expands in chambers sweeping through area 122, additional expansion work is produced, causing the engine to rotate. The embodiment exerts a nearly constant positive torque on the output shaft. The working medium which was expanded in 122 is then swept into zone 123 where volume per chamber is substantially constant. A slight variation from constancy is permitted to effect a smooth transition between the varying wall radius or curvature of the previous zone 122 and a constant radius. Non-heat exchange zone 123 subtends an arc angle approximately equal to the angular separation between two vanes to prevent working medium from overlapping heater section 122 and the recuperator section 124. However, when the angle of potential overlap is small in proportion to the arc angle subtended by the recuperator it is not very harmful to engine efficiency if the area of separation between the recuperator and an expansion or a compression area is reduced or eliminated by lengthening the recuperator arc or the compression or expansion arcs. Thus, while these non-exchange areas are preferably incorporated in an embodiment they are not strictly necessary for its operation.

Recuperator area 124 of constant radius is downstream of zone 123. The temperature and pressure of the expanded working medium decrease as it moves without volume change through zone 124 because the moving medium constantly loses heat to the peripheral wall by evaporating a saturated fluid in capillary wicks in heat pipes 125 contained in the peripheral wall. Since the temperature of the working medium passing area 124 decreases in the downstream (clockwise) direction, a falling temperature gradient in the heat pipes is established in the clockwise direction. The colder, compressed working medium which is simultaneously sweeping counterclockwise through the opposite branch of the recuperator (area 142 in cavity 94) consequently encounters a rising wall temperature gradient and its temperature and pressure rise as it progressively gains heat by causing condensation of the saturated vapor in the opposite ends of the recuperator heatpipes.

After passing area 124 the expanded and partially cooled working medium is swept through non-exchange area 126 which prevents inefficient overlap of working medium between the recuperator and the section cooled by the cooler 151. Downstream of area 126, constant volume zone 127 is provided with heat pipes 132 which cool the working medium by heat exchange with an external heat sink, such as cooler 151, while another first-stage compression phase is begun.

It is extremely important to the efficiency of an embodiment engine that the recuperator should transmit heat between the cavities as efficiently as is practical and with a minimum degree of thermodynamic irreversibility. The minimum practical thermodynamic irreversibility will occur if the embodiment provides a relatively large number of heat pipes in the recuperator which are spaced to make the temperature gradient along the recuperator as smooth as possible.

Recuperator efficiency rises as the difference in temperature of the working medium on opposite sides of intermediate wall 93 is reduced. This can be done by making the cavity wall thickness separating the engine working medium from the heat pipe medium as thin as practical within the limitations of the strength of the materials of which the embodiment is constructed. Cavity walls and heat pipe walls in the recuperator preferably have excellent conductivity. Recuperator efficiency rises as the arc length of the recuperator sections is increased, since this increases the recuperator heat-exchange area and reduces the required rate of heat transmission per unit area. It is also beneficial to recuperator efficiency if surface-volume ratio in the recuperator is large. Heat pipes used in the recuperator should have a total transmission capacity at the designed operating temperatures at least equal to the required heat flux across the cavity walls at the designed output rating. No recuperator can be 100% efficient and efficiency will fall as engine speed and output are increased beyond the maximum efficiency. Since the recuperator will not ordinarily raise the temperature of the compressed working medium leaving recuperator section 142 to be quite equal to the temperature of the expanded working medium entering recuperator section 124 a constant-volume reheat section 144 downstream of non-exchange area 143 is provided with heat pipes 120 to add external source heat from heater 121 to the working medium before expansion in first stage expansion section 145. Heat pipes can ordinarily attain higher heat transport capacities if their condensing sections are oriented vertically above their evaporating sections and it is therefore preferable in prime mover embodiments to have the recuperator heat pipes vertically oriented (i.e., shafts 97 and 104 are vertically mounted) and to have cavity 94, which contains the condensing ends of heat pipes 125, vertically above cavity 91.

It is advantageous for many applications of the FIG. 6 embodiment that it can exert a substantially steady torque at the output shaft thus enabling it to replace a reciprocating engine requiring several pistons in order to maintain a fairly steady torque. Engine torque can also be very constant over a wide range of operating speeds if operating temperatures are kept steady and less complex gearing is therefore required than in an engine in which the torque is more variable. In the "rotary vane" embodiment of the invention, torque drops at slow speeds as leakage of working medium between chambers grows more serious and torque drops at higher speeds as friction losses grow and required heat-exchange rates begin to exceed capacity.

Any prime mover engine embodiment of the invention can with some minor modifications, be converted to a heat pump. Unlike a prime mover, a heat pump does not produce a surplus of work but must be externally driven. The primary thermodynamic difference between prime mover and heat pump embodiments of the invention is in the differing temperatures of compression and expansion of the working cycle. In the prime mover embodiment, the temperature of the compression cycle is ideally the low temperature of the cycle and that of the expansion phase is the high temperature of the cycle. In contrast, in the heat pump embodiment, the working medium is compressed at the upper temperature of the cycle and heats some external body or substance by rejecting heat to it at that upper temperature, and the heat pump expansion phase temperature is the cycle low temperature. As the heat pump working medium expands it absorbs heat from a heat source which is colder than the compression temperature at which the heat pump rejects heat.

Assuming that an external power source is employed to drive the rotors, the operation of the embodiment of FIGS. 6, 7, and 8 as a heat pump will now be described. Inasmuch as the particular form of motive power, be it an electric motor or some other type of prime mover, is incidental to an understanding of this invention, the source of external power will not further be described.

The flow path of the working medium around the two cavities 91 and 94 is identical to that in the prime mover. As in the prime mover, rotor 96 sweeps a gaseous working medium clockwise around cavity 91 and rotor 103 sweeps the working medium counter-clockwise around cavity 94. The sequence of volume changes is also identical. The working medium enters cavity 94 through duct 130 in a constant volume transfer. It then undergoes a second stage of compression in section 139 and passes counterclockwise at constant volume through recuperator zone 142. It next undergoes a first expansion stage in zone 145 and then passes through zone 146 of cavity 94 and is transferred at constant volume through duct 117 into cavity 91. In cavity 91 the working medium is swept clockwise by the rotor vanes. The medium passes through section 118 at constant volume, and then is expanded through a second stage in expansion zone 122. After passing expansion zone 122, the medium is swept through constant-volume regenerator zone 124, then through the first stage of compression in 128 and lastly through constant volume zone 129 before being swept out of cavity 91 through duct 130 and returned to cavity 94.

The thermal paths in the heat pump are, however, different from the thermal paths in the prime mover. In the heat pump, the temperature of the cooler 151 to which the working medium rejects heat during compression is higher than the temperature of the heater 121 which provides heat from an external source to the working medium during expansion. For instance, if the heat pump is used to heat a room, the compression temperature of the working medium will evaporate the medium in heat pipes 132 at a temperature above outside air temperature and the room air can be heated by passing it across the condensing end of the heat pipes in cooler 151 causing its temperature to rise as it condenses the heat pipe working fluid vapor. The cold outside air or some other reservoir of lower temperature heat will at the same time provide heat to evaporate the medium in heat pipes 120 thus causing heating of the working medium as it expands in 145 and 122 at a temperature lower than the condensation temperature of the working fluid vapor in heat pipes 120. If the heat pump is used to cool a room, the compression temperature of the working medium enables it to lose heat through cooler 151 to an outside reservoir such as the atmosphere and the expansion temperature is lower than the desired room temperature thus allowing the room air to be cooled by providing heat through heater 151 and heat pipes 120 to the working medium as it expands. Thus, when the invention is used as a heat pump, its compression temperature is higher than its expansion temperature but if used as a prime mover, the expansion temperature of the working medium is higher than its compression temperature.

In the engine embodiments which operate in a heat recuperative cycle, heat pipes 125 as in FIGS. 7 and 8 form a recuperator which exchanges heat between working medium which has been compressed and working medium which has been expanded. In a prime mover embodiment the working medium is heated in the recuperator after it has been compressed and is cooled in the recuperator after it has been expanded. In the heat pump embodiment the working medium is cooled in the recuperator after compression and reheated after it has been expanded. Thus, when the FIG. 6 embodiment is constructed for heat pump operation, the working medium which is compressed at a higher temperature in second-stage compression area 139 in cavity 94 is afterwards cooled by successively cooler heat pipes 125 as it sweeps counter-clockwise through the constant-volume recuperator section 142, and colder working medium which is swept clockwise out of the second expansion stage 122 in cavity 91 afterwards is heated at constant volume by the opposite ends of heat pipes 125 as it is displaced through the recuperator section 124.

In several prime mover embodiments which have been described, the working medium passes through a constant-volume phase of heat exchange with the heater or the cooler after passing through a branch of the recuperator (one of the recuperator areas) and before it is next expanded or compressed. A similar reheat or recooling phase can be utilized in heat pump embodiments, except that in that case the constant-volume reheat or recool phase occurs in an interval of the work cycle after compression or expansion is completed and just before the working medium passes through the recuperator. FIG. 11 is a typical pressure volume diagram for a heat pump embodiment. Non-adiabatic, first-stage compression along curve AB is followed by a re-cooling stage at constant volume represented by line segment BC and by second stage compression on curve CD. A drop in pressure then ensues due to a phase of constant volume recooling, as shown by the vertical line segment DE. Pressure of the working medium decreases still further as the compressed working medium is then cooled at constant volume in one branch of the recuperator, depicted by line segment EF. Expansion then occurs, starting at the lowest temperature reached in the recuperator. The pressure drop during the two phases of expansion with interheating at constant volume is shown by curve FG, vertical line GH and second stage curve HI. A phase of constant volume reheating is then accomplished along vertical line segment IJ after the end of the second phase of expansion and before further heating and pressure rise in the recuperator, along constant volume line JA.

In any of the embodiments of the invention whether heat pump or prime mover, it is possible to use other means for heat transfer in the different phases of the thermodynamic working cycle of the embodiment than those described in the text and depicted in the illustrations. In FIG. 8, heat pipes 132, for instance, might in some embodiments be replaced by fins for aircooling of the medium during compression. Heat pipes 120 might similarly be replaced by other means for conveying heat into the medium during expansion, such as pipes carrying a liquid or a hot gas or a vapor. And similarly, heat pipes 125 in the regenerator sections could be replaced with pipes circulating a pumped fluid in the cavity walls to effect the proper counterflow exchange. While different materials will be used in constructing prime mover embodiments and heat pump embodiments of the invention it is preferable in all embodiments that the rotors should be constructed so as to have the lowest possible conductivity and heat capacity in order to minimize short-circuiting of heat through the rotor or its vanes between hot spaces and cold spaces. Seal areas 131 and 137 should also be constructed to conduct the smallest possible amount of heat through the casing between duct areas 130 and 117 and spaces 124 and 118 and 146 and 138. Heat pipes 125 or other heat exchange means in the recuperator areas should be located as near the interior surface of the cavity wall as structurally practical to improve heat exchange capabilities of the recuperator. It is of course preferable that the wall temperature in areas of the recuperator in the same axial plane be as nearly equal as possible. It is important to insulate the engine casing in areas at a different temperature than ambient to minimize unwanted heat loss or heat gain.

It is very important to the efficiency and output of any heat engine with a regenerative cycle to have the temperatures of the compression and expansion phases as nearly isothermal as possible and as nearly as possible equal to the temperatures of the heat sink and the external heat source. However, it is not practical in any real heat engine with a reasonable rate of output to closely approach isothermality at the temperatures of the external heat source and heat sink. Heat engines of the invention which have two compression and two expansion stages, with constant volume re-cooling or reheating phases between stages can approach isothermal compression and expansion more easily than can regenerative engines with one-stage compression and expansion.

Rotary vane embodiments of slightly different arrangements but identical in operating principle to the embodiment of FIG. 6 can be constructed. All have in common the method already described of non-adiabatic compression and expansion within chambers between vanes which rotate around a cavity and all share the same recuperator method which effects the exchange of heat between counter-rotating constant-volume vane chambers in different cavities, in which heat pipes are the preferred recuperative heat exchange means. The other embodiments can differ, for example, in having a single compression or expansion phase instead of two and in the provision or absence of a post-recuperator phase of constant-volume heating or cooling of the working medium in a rotating vane chamber, before it is next compressed or expanded.

For example, the FIG. 6 embodiment could be reconstructed by changing its first stage expansion area 145 to a constant volume area receiving heat from the heater 121 and by changing its first stage compression area 128 to a constant volume area transferring heat to cooler 151. In that case, the recuperator angle could then be lengthened to include areas 126 and 123 in cavity 91 and 141 and 143 in cavity 94. The resultant embodiment would then have only one compression and expansion stage. Other variant embodiments could have any combination of either one or two compression or expansion stages whether with or without a post-recuperator reheat or recooling phase. Similar variant embodiments are possible in rotary vane heat pumps according to the invention. However, in a heat pump the constant volume re-cooling or reheating phase must precede passage through the recuperator instead of following it, as in the prime mover embodiments described.

It is possible to construct embodiments of the invention employing rotors with slideable vanes of the FIG. 6 type but comprising more than two rotors. For example, FIG. 12 schematically depicts an embodiment which employs 8 rotors but which nevertheless operates according to a thermodynamic cycle comprising substantially the same phases as in the FIG. 6 embodiment. In its prime mover mode of operation, the 8 rotor embodiment has: a compression phase of two non-adiabatic stages in which the working medium is cooled during its compression; a constant volume intercooling phase between the compression stages; a constant-volume phase where the compressed working medium is heated in one branch of the recuperator; a constant volume reheat phase where the working medium is additionally heated by external-source heat; an expansion phase of two non-adiabatic stages in which the medium is heated as it expands and a constant-volume interheating phase between the expansion stages; a constant-volume phase where the expanded working medium is cooled in the other branch of the recuperator and a constant-volume recooling stage where the working medium before re-compression is additionally cooled by heat-exchange with an external heat sink.

The FIG. 12 embodiment is also mechanically similar to the FIG. 6 embodiment and utilizes essentially the same type of cylindrical rotors with slideable vanes rotating in cavities connected in a similar manner by ducts and coordinated in their rotation to cause the duct transfer heating and cooling processes to occur nearly at constant volumes. However, in the FIG. 12 embodiment each branch of the recuperator comprises two entire rotor cavities, as does each stage of the compression phase and each stage of the expansion phase. In operation of the FIG. 12 embodiment working medium at the compression temperature, $T_c$, enters port A of rotor cavity C1 and is non-adiabatically compressed in a first compression stage while rotating clockwise around the cavity in vane chambers formed between vanes in the manner of the FIG. 6 embodiment. Medium is next displaced out of port B of rotor cavity C1 and transferred substantially at constant volume through duct BC in which it is simultaneously recooled to about $T_c$. Medium enters cavity C2 via port C at the end of duct BC and in C2 it undergoes a second compression phase. A cooler, preferably having the same principle of construction as the heater shown in FIG. 9, is employed to maintain the peripheral cavity walls of cavities C1 and C2 and interior surfaces within duct BC as far as practical at a single surface temperature lower than $T_c$. Cooling means may be employed as in FIG. 13, where heat pipes 15 are set directly in the flow area of the duct 16. The heat pipes can carry fins 17 to dissipate the heat or can be connected at the heat dissipation end to a heat sink.

The length and volume of duct BC in FIG. 12 have substantially no influence on the compression ratio of the two stages. Medium is transferred out of C2 through duct DE into cavity R1A. All duct transfers in the engine are preferably substantially constant-volume transfers in the manner described for the FIG. 6 embodiment. Working medium enters port E of constant radius cavity R1A where it is heated in a first recuperative heating stage and then leaves port F of cavity R1A, is transferred through a heavily insulated duct FG through port G of cavity R2A of constant radius where it is heated by the same recuperator method to a still higher temperature. After completing the sweep around cavity R2A, the medium then leaves R2A by port H and enters duct HI. External heating means preferably maintain the surface temperature of heat exchange means in duct HI, and in cavities E1 and E2 and duct JK at some near-uniform temperature above $T_e$ the temperature reached by the working medium during expansion. Accordingly, if the temperature of the working medium which has passed through R1A and R2A is below $T_e$ its temperature can rise to $T_e$ in duct HI.

A positive work output is produced as working medium is heated as it sweeps around cavity E1 in a first expansion stage, and then is reheated approximately to $T_e$ in duct JK and then further heated as it is expanded in second stage expansion cavity E2. Working medium which is swept out of port L of cavity E2 by the positive displacement of the vanes on the E2 rotor next travels through heavily insulated duct LM and enters rotor cavity R2B, where it is cooled recuperatively at constant volume in the rotating vane chambers. As in the FIG. 6 embodiment, heat pipes preferably are used to effect the heat transfer between the two-stage branch of the recuperator comprising rotor cavities R1A and R2A and the other two-stage branch, comprising rotor cavities R1B and R2B. Rotor R1A rotates oppositely to rotor R1B and R2A rotates oppositely to R2B. Heat pipes cause wall temperatures in the same axial plane in R1A and R1B to be about equal, and also in R2A and R2B. The hot expanded working medium which emerged from cavity E2 is therefore recuperatively cooled substantially without volume change in R2B and then transferred with very little volume or temperature change through heavily insulated duct NO and then further cooled at constant volume as it is swept around recuperator cavity R1B, by losing heat to the compressed working medium sweeping through R1A. After sweeping around cavity R1B, working medium is then passed at constant volume through duct PA, in which its temperature is further reduced by its giving up heat to the cooler to return it to the value $T_c$ for the cycle before entering another compression phase, thus completing a full working cycle.

This prime mover embodiment can also be used as a heat pump where as earlier explained the compression temperature is the high temperature of the cycle and the expansion temperature is the low temperature of the cycle. In that case, duct DE is utilized as a recooling space and working medium is progressively cooled rather than heated in the recuperator branch comprising cavities R1A and R2A, and duct HI does not include heat exchange means but is heavily insulated to prevent ambient heat gain. After passing through expansion in E1 and low-temperature reheater in duct JK, the medium expands again in E2 and is reheated in duct LM to its temperature when it entered E1. In the recuperator branch comprising R2B and R1B counterflow heat exchange again heats the cold expanded working medium at constant volume almost to the compression temperature $T_c$, after which it returns to C1 through duct PA.

It is clear from the principles of construction and arrangement of the FIGS. 6 and 12 embodiments that many other multi-rotor variant embodiments of the invention can be built, with any combination of one or more compression stages, expansion stages and recuperation stages. For example, a four-rotor embodiment could comprise one compression rotor cavity, one expansion rotor cavity and two recuperator cavities, and variants could have any number of compression, expansion and recuperator stages.

Such multi-rotor embodiments offer a number of constructional advantages.

The recuperator stage rotor cavities, for example, except for the seal areas can be constructed with a single, circular radius of curvature and thus are much less expensive to fabricate than cavities having several varying circular radii linked by transitional surfaces of complex curvature. Circular radius surfaces are also easier to seal than compound surfaces, since vanes can have radiused ends with the same radius of curvature as the rotor surface, and it is easier in a circular cavity to control the necessary extremely small clearance desirable between the vane ends and the peripheral wall, in order to reduce friction to a minimum without at the same time harmfully increasing leakage between chambers. Since any expansion or compression rotor cavity can have essentially a single curvature these cavities are also simpler to machine than the more complex surfaces used in some embodiments with two rotors. Operationally, stresses due to temperature differential are of course minimal in an expansion or a compression cavity designed to operate at a single wall temperature throughout and such thermal stresses can be small in magnitude in one rotor cavity of a recuperator having several stages comprising several cavities, since the temperature differential per cavity is thereby reduced. An embodiment similar to the FIG. 12 type could easily be constructed as either an open cycle prime mover or heat pump simply by omitting duct PA in FIG. 12. In that case, port A in cavity C1 becomes an intake port and port P an exhaust port to some reservoir such as the atmosphere.

In constructing embodiments having high specific power output or heat pumping capacity, it is also clear that it is advantageous to employ a larger number of smaller diameter rotors than it is to employ a smaller number of rotors of larger diameter, since engine volume increases as the cube of the characteristic dimension but engine output only as the square, because output is a function of heat exchange area, which increases only as the square of the dimension. Engines having many rotors can be made up of engines of the FIG. 6 type connected in parallel or may be of the FIG. 12 type, where cavities are connected in series and each cavity comprises a stage either of compression or expansion or recuperation.

Recuperator efficiency can be increased in an engine of the multi-stage type of FIG. 12 by increasing the number of recuperator stages per branch and thereby lessening the average temperature difference required between the recuperator branches to produce the total heat exchange rate needed at a given output rate. When this is done (that is, when the number of stages and hence the length per branch of the recuperator is increased by increasing the number of cavities per branch), the hot expanded working medium can heat the cold compressed working medium more nearly to $T_c$ and can be cooled by the cold compressed working medium more nearly to $T_e$ than would be the case of the total length per branch were shorter.

It is also easier to approach isothermal compression or expansion in an engine of the FIG. 12 type by utilizing an increased number of stages with a smaller compression or expansion ratio per stage and a constant volume interheat or intercool phase in the duct between each pair of stages. This is an important advantage because at any given set of values of $T_c$, $T_e$ and heat-exchange efficiency in the recuperator, engine thermal efficiency rises as compression and expansion become more nearly isothermal.

Engine design is also simplified in multi-stage engines of the FIG. 12 general type, having four or more rotor cavities, because lengths and areas of the recuperation, expansion and compression areas or stages of the engine can be determined independently of each other. In engines of the FIG. 6 type the effectiveness of the reheat or recool phases which occur between the recuperator and expansion or compression phase may be limited because they must inevitably occupy some portion of the available periphery of a rotor cavity, but in the multi-stage embodiments of the FIG. 12 type these reheat or recool phases can be much more effective because they occur in ducts where heat exchange surface areas may be as large as necessary, without reducing the available arc length of the recuperator, compressor or expander.

While various embodiments of the invention are depicted in the drawings and others are described in the foregoing exposition as modifications of the illustrated embodiments, it is apparent to those familiar with heat engines that other changes can be made that do not alter the nature of the invention. It is intended therefore, that the invention not be restricted to precise embodiments depicted or described.

I claim:

1. An engine comprising
   (1) a stator providing a plurality of cavities,
   (2) each cavity receiving a rotor whereby the walls of the cavity and the rotor form a generally annular passage for accommodating the flow therealong of a working medium,
   (3) each rotor carrying a plurality of partitions which extend across the passage, the partitions being spaced apart by fixed angles and being arranged to transit around the passage whereby two adjacent partitions form end walls of a closed chamber which moves around the passage upon rotation of the rotor,
   (4) means for causing the partitions in one passage to transit that passage in timed relation to the transit of the partitions in at least one other passage,
   (5) two adjacent partitions in each of at least two of the aforesaid timed relation passages providing a moving chamber whose volume remains constant during at least an appreciable part of each full revolution of the rotor,
   (6) each passage having blocking means forming a closure across the passage and inhibiting the working medium from flowing through the blocked portion of the passage,
   (7) means permitting the partitions in their transit around a passage to pass the blocking means, whereby those partitions can revolve continuously,
   (8) at least one inlet port and one outlet port in each passage, the inlet and outlet ports of the passage being situated adjacent to and being respectively on opposite sides of the blocking means, whereby working medium inducted through an inlet port first occupies a chamber of increasing volume, then a moving chamber transiting the passage, then a chamber of decreasing volume from which it is exhausted through the outlet port,
   (9) duct means interconnecting the passages, whereby a series of passages is formed having an outlet port of a passage connected by a duct to an inlet port of the next passage in the series, and working medium can be inducted into the inlet port of a first passage and later exhausted from the outlet port of the last passage, having been swept in turn through every passage in the series from first to last flowing from passage to passage through the interconnecting ducts,
   (10) recuperative heat transfer means arranged to heat the wall surface of at least a portion of the length of arc traversed in one of said at least two passages by a moving constant volume chamber whereby working medium in the constant volume chamber is heated as it is swept along the heated wall portion and arranged to cool the wall surface of at least a portion of the length of arc traversed by a constant volume chamber in the other of the said at least two timed relation passages, whereby the working medium in that constant volume chamber is cooled as it is swept along the cooled wall portion.

2. The engine according to claim 1, further including a duct means interconnecting the outlet port of the last passage to the inlet port of the first passage, whereby working medium is retained within the engine and recycled through the passages.

3. The engine according to claim 1, further including
   (11) means for causing the rotor in one of said two timed relation passages to turn in the direction counter to the rotational direction of the rotor of the other of the said two passages, and wherein the heat transfer means causes recuperative heat exchange between working medium in the two passages whereby initially colder working medium confined in the moving constant volume chambers is heated and initially hotter working medium confined in the second passage is cooled by the exchange.

4. The engine according to claim 2, further including
   (12) a duct means interconnecting the outlet port of the last passage to the inlet port of the first passage, whereby working medium is retained within the engine after being exhausted from the last passage and recycled through the series of passages.

5. An engine comprising
   (1) a stator providing first and second cavities,
   (2) each cavity receiving a rotor whereby the walls of the cavity and the rotor form an annular passage, each passage being of constant radius and accommodating the flow therealong of a working medium, the net enclosed maximum volume of the first annular passage so formed being larger than the net enclosed maximum volume of the second annular passage, each rotor being arranged to rotate on an axis fixed with respect to the cavity, the axis being perpendicular to a radial plane through the center of the annular passage,
   (3) each rotor having a plurality of pistons extending across the passage, the pistons being spaced apart in fixed relation to one another, the pistons moving around the passage upon rotation of the rotor whereby two adjacent pistons form a closed moving chamber of constant volume during an appreciable part of each full rotor revolution,
   (4) means for causing the pistons in the first annular cavity to rotate oppositely to the direction of rotation of the pistons in the second cavity,
   (5) a first gate associated with the first annular passage, the first gate being adapted to block the passage to inhibit flow of the working medium directly from one side of the gate to the other and to unblock the passage to permit each piston to pass and thereupon immediately block the passage, (6) a second gate associated with the second annular passage, the second gate being adapted to block the passage to inhibit flow of the working medium directly from one side of the gate to the other and to unblock the passage to permit each piston to pass and thereupon immediately block the passage, (7) at least one inlet and one outlet port in each passage, the inlet and outlet ports of the passage being situated adjacent to and being respectively on opposite sides of the gate whereby working medium inducted through an inlet port is swept around the passage while confined in a moving chamber and is then exhausted from the passage through an outlet port, (8) first and second ducts, each duct extending between the first and second annular passages and connecting the inlet port of one passage to the outlet port of the other passage, and (9) heat transfer means disposed to effect recuperative heat exchange between working medium confined in constant volume chambers in the first annular passage and working medium confined in constant volume chambers in the second annular passage whereby the working medium so confined in one passage is heated by heat transferred from the working medium so confined in the other passage.

6. An engine according to claim 5, wherein the heat transfer means comprises a common wall between the first and second annular passages through which recuperative heat transfer is effected.

7. An engine according to claim 5, wherein each rotor has at least three pistons symmetrically spaced around the passage.

8. A heat engine comprising
(1) a stator providing a plurality of cavities
(2) each cavity receiving a rotor adapted for rotation around an axis fixed with respect to the cavity,
(3) each rotor being provided with partitioning members adapted to extend within the cavity and form with the cavity wall and the rotor body several separated spaces for accommodating a working medium,
(4) means for causing the rotor in one cavity to rotate in timed relation to the rotation of the rotor in at least one other cavity,
(5) two adjacent members of one rotor in each of at least two of the aforesaid timed relation cavities forming with the cavity wall and the rotor body a closed chamber which moves through the cavity when the rotor rotates and whose enclosed volume remains constant for a substantial portion of each full revolution of the rotor,
(6) blocking means associated with each cavity and arranged to extend from the cavity wall, whereby a separated space between two moving rotor members is subdivided simultaneously into a chamber of decreasing volume between one side of the blocking means and a member moving towards it in the cavity and a chamber of increasing volume between the opposite side of the blocking means and a member moving away from it in the cavity, whereby in each of the said at least two cavities there can exist simultaneously a chamber of increasing volume, a chamber of decreasing volume and a chamber of constant volume, and
(7) heat recuperator means arranged to transfer heat from working medium confined in a constant volume chamber in one of the timed relation cavities to working medium confined in a constant volume chamber in another of the timed relation cavities.

9. An engine comprising
(1) a stator providing a plurality of cavities,
(2) each cavity receiving a rotor whereby the walls of the cavity and the rotor form a loop passage which accommodates the flow therealong of a working medium, each rotor being arranged to rotate about an axis fixed with respect to its cavity,
(3) partitions carried by each rotor, the partitions being arranged to extend across the passage and divide the passage into a plurality of chambers, the chambers being caused to move around the loop upon rotation of the rotor,
(4) blocking means in each passage forming a closure across the loop passage which substantially inhibits direct flow of the working medium from one side of the blocking means to the other,
(5) means permitting the partitions to pass from one side of the blocking means to the other side upon rotor rotation,
(6) at least two of the loop passages being configured to cause the volume of working medium confined in moving chambers in each of those passages to remain substantially constant during at least an appreciable portion of one full revolution of the rotors of those cavities,
(7) at least one inlet port and one outlet port in each passage, the inlet and outlet ports of the passage being situated adjacent to and being respectively on opposite sides of the blocking means, whereby working medium inducted through an inlet port first occupies a chamber of increasing volume, then a moving chamber transiting the passage, then a chamber of decreasing volume from which it is exhausted through the outlet port,
(8) duct means interconnecting the passages whereby a series of passages is formed having an outlet port of a passage connected by a duct to an inlet port of the next passage in the series, and working medium can be inducted into the inlet port of a first passage and later exhausted from the outlet port of the last passage, having been swept in turn through every passage in the series from first to last flowing from passage to passage through the interconnecting ducts,
(9) at least two of the loop passages being configured to cause the volume of working medium confined in moving chambers in each of those two passages to remain constant during at least an appreciable portion of each one full revolution of the rotors of those cavities, and
(10) recuperative heat transfer means arranged in a first heat transfer zone to heat the wall surface in at least a portion of the length of arc traversed in one of said at least two loop passages by a moving constant volume chamber whereby working medium in the constant volume chamber is heated as it is swept along the heated wall portion and arranged in a second heat transfer zone to cool the wall surface in at least a portion of the length of arc traversed by a constant volume chamber in the other of the said at least two loop passages whereby the working medium in that constant volume chamber is cooled as it is swept along the cooled wall portion, whereby in the cyclic operation of the engine the working medium is compressed, then subjected to recuperative heat transfer, than expanded, and then subjected to recuperative heat transfer before a new cycle begins.

10. The engine according to claim 9, further including

(14) heat exchange means for causing heat from an external source to be transferred into the working medium while it is being expanded,

(15) heat exchange means for causing heat to be transferred out of the working medium to an external heat sink means while it is being compressed, and

(16) means for causing the rotor in one of the aforesaid heat transfer zone passages to rotate counter to the rotational direction of the rotor in the other one of the two said passages.

11. The engine according to claim 10, further including

(17) a duct means interconnecting the outlet port of the last passage to the inlet port of the first passage, whereby working medium is retained within the engine after being exhausted from the last passage and recycled through the series of passages.

12. The engine according to claim 9, wherein the heat transfer means comprise heat pipes employing a saturated fluid and wicking which conveys the fluid in liquid form from the condensing segment of the heat pipes, where it delivers heat, to the evaporating segment of the heat pipes, where heat is received by evaporation of the liquid fluid at the saturation temperature with the vapor pressure in the heat pipe enclosure, the heat pipes being disposed in the stator and arranged in an array whereby the working medium is progressively heated in the moving constant volume chambers in one of said at least two of the loop passages which pass close to the condensing segments of the heat pipes and the working medium is progressively cooled in the moving constant volume chambers of the other of said at least two of the loop passages which pass close to the evaporating segments of the heat pipes.

13. The engine according to claim 9, wherein each rotor has a plurality of pockets in which the partitions are slidably disposed and wherein the means permitting the partitions to pass from one side of the blocking means to the other causes each partition to retract into its pocket as the partition approaches the blocking means in the transit of the partition around the loop passage.

14. The engine according to claim 13, wherein the means for compressing the working medium prior to subjecting the working medium to recuperative heat exchange includes the configuration of the stator wall in one of the passages, and the means for expanding the working medium prior to subjecting the working medium to recuperative heat exchange includes the configuration of the stator wall in another of the passages.

15. The engine according to claim 14, further including means for causing the rotors of said at least two of the loop passages to rotate in opposite directions and in timed relationship.

16. The engine according to claim 15, wherein working medium which has had its temperature changed in a constant volume heat recuperation phase is caused to undergo phases of expansion in at least two successive cavities of the engine and the heat exchange means includes apparatus situated in a duct connecting said at least two successive cavities, and the engine further includes an external heat source for providing heat to the apparatus in the connecting duct to cause the working medium to be heated before it undergoes the next expansion phase.

17. The engine according to claim 15, wherein working medium which has had its temperature changed in a constant volume heat recuperation phase undergoes phases of compression in at least two successive cavities of the invention and the heat exchange means includes connecting said at least two successive cavities, and the engine further includes an external cooling source connected to said apparatus in the connecting duct for lowering the temperature of the medium before it undergoes the next compression phase.

* * * * *